(12) United States Patent
Frazer et al.

(10) Patent No.: US 7,107,767 B2
(45) Date of Patent: Sep. 19, 2006

(54) HYDRAULIC ENERGY STORAGE SYSTEMS

(75) Inventors: Hugh Ivo Frazer, Lower Portland (AU); William Raymond Evans, Isle of Man (GB); Peter Russell Mattin, Isle of Man (GB)

(73) Assignee: Shep Limited, Isle of Man (GB)

( * ) Notice: Subject to any disclaimer, the term of this patent is extended or adjusted under 35 U.S.C. 154(b) by 70 days.

(21) Appl. No.: 10/432,880

(22) PCT Filed: Nov. 28, 2001

(86) PCT No.: PCT/IB01/02785

§ 371 (c)(1),
(2), (4) Date: Jan. 7, 2004

(87) PCT Pub. No.: WO02/43980

PCT Pub. Date: Jun. 6, 2002

(65) Prior Publication Data

US 2004/0103656 A1    Jun. 3, 2004

(30) Foreign Application Priority Data

Nov. 28, 2000  (AU) .................................. PR 1705
Apr. 20, 2001  (AU) .................................. PR 4493

(51) Int. Cl.
*F16D 31/02*  (2006.01)

(52) U.S. Cl. .......................................... 60/414; 60/456
(58) Field of Classification Search .................. 60/414, 60/419, 456
See application file for complete search history.

(56) References Cited

U.S. PATENT DOCUMENTS

| | | | | |
|---|---|---|---|---|
| 2,721,446 A | | 10/1955 | Bumb | |
| 2,961,829 A | * | 11/1960 | Weisenbach | .................. 60/464 |
| 3,722,365 A | * | 3/1973 | Olsson | ...................... 91/445 |
| 4,098,083 A | * | 7/1978 | Carman | ...................... 60/414 |
| 4,212,228 A | * | 7/1980 | Heaton | ...................... 60/369 |
| 4,215,545 A | * | 8/1980 | Morello et al. | ............... 60/414 |
| 5,317,872 A | * | 6/1994 | Ingvast | ...................... 60/456 |
| 5,579,640 A | | 12/1996 | Gray, Jr. et al. | |
| 6,363,719 B1 | * | 4/2002 | Mohr et al. | .................... 60/414 |

FOREIGN PATENT DOCUMENTS

DE          4212542 A1     10/1993

* cited by examiner

*Primary Examiner*—F. Daniel Lopez
(74) *Attorney, Agent, or Firm*—Stroock & Stroock & Lavan LLP

(57) ABSTRACT

A hydraulic energy storage system for vehicles to provide higher efficiency, smaller package size, lower weight, unitary construction, durability and enhanced reliability while maintaining the capability to efficiently store and restore energy at high power levels.

36 Claims, 23 Drawing Sheets

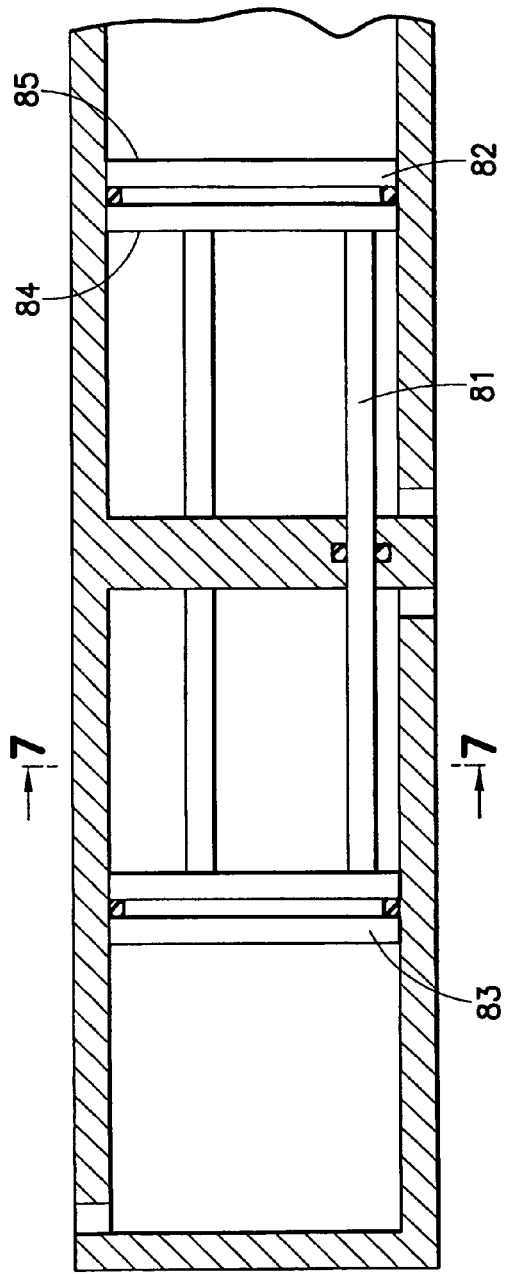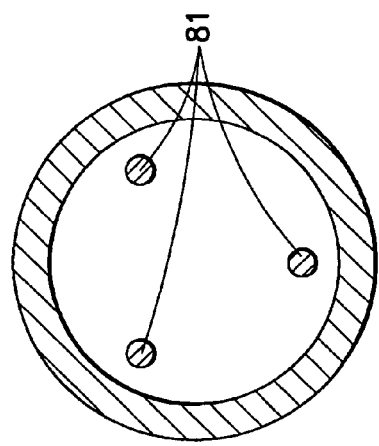

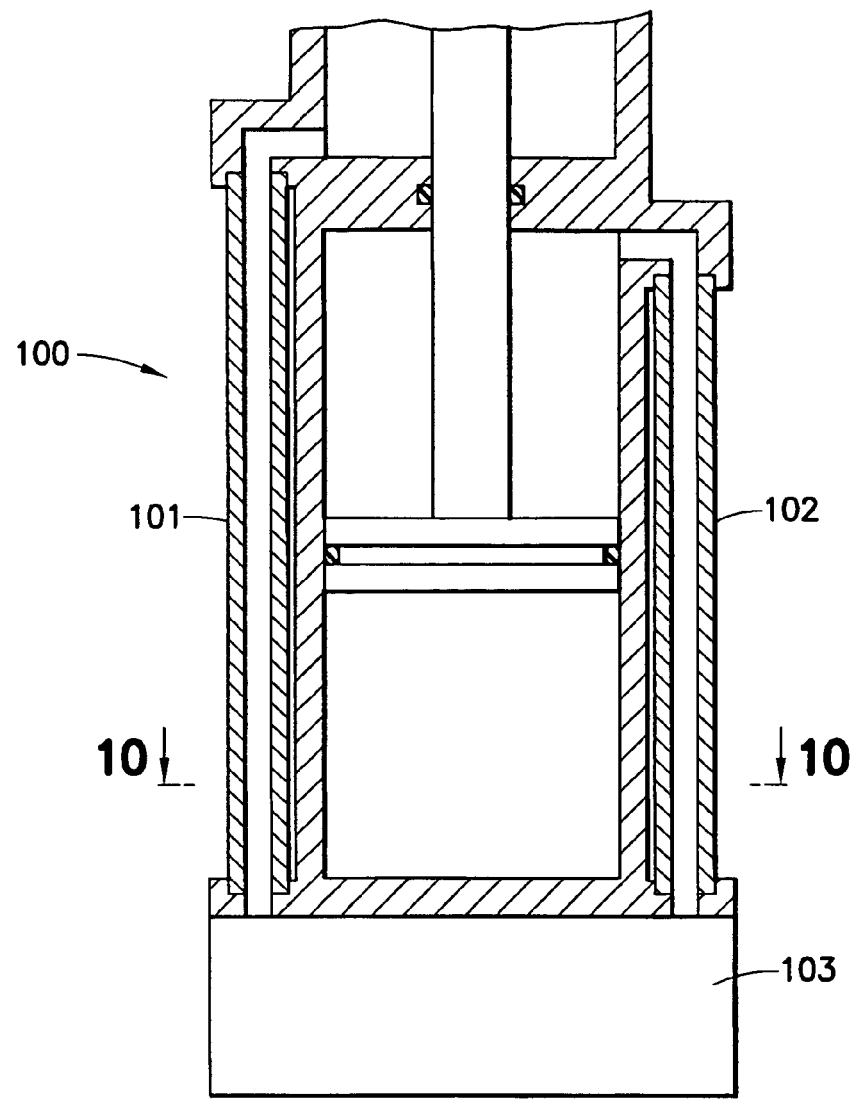
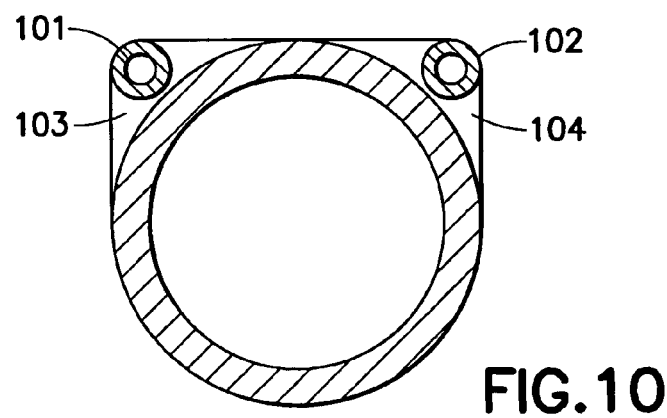
FIG.9
FIG.10

HYDRAULIC ENERGY STORAGE SYSTEMS

BACKGROUND OF THE INVENTION (i) Field of the Invention

This invention relates to hydraulic energy storage systems and, more particularly, relates to hydraulic energy storage systems used in vehicles to provide higher efficiency, smaller package size, lower weight, unitary construction, durability and enhanced reliability while maintaining the capability to efficiently store and restore energy at high power levels.

(ii) Description of the Related Art

Vehicles equipped with hydraulic energy storage systems have the ability to store kinetic energy while braking, rather than dissipate it through the brakes, and then restore it for subsequent acceleration. Such vehicles are commonly called "Hydraulic Hybrid" when the vehicle prime mover also contributes to the energy store, or "Stored Hydraulic Energy Propulsion" (SHEP) when only the vehicle energy is stored. This application refers to SHEP storage, but the inventions disclosed herein may be equally applicable to hydraulic hybrid vehicles.

The improvements of the present invention apply to hydro-pneumatic accumulators that are normally used to store energy in SHEP vehicles, Hydraulic Hybrids and to the associated hydraulic circuitry. In line with industry practice, the term "fluid" as used in this application refers to hydraulic fluid, typically a liquid such as a specially formulated mineral oil The term "gas" refers to the gas used to pre-charge a hydro-pneumatic accumulator, typically being dry nitrogen.

The performance and fuel economy of a vehicle, particularly one subject to frequent stops and starts, can be improved by recovering and storing the vehicle kinetic energy during deceleration and then restoring it, less any losses that may occur, during subsequent acceleration. SHEP systems have a hydraulic pump/motor (P/M) that can be connected to the drive train of the vehicle, so that the vehicle can be decelerated by pumping high pressure hydraulic fluid into a hydro-pneumatic accumulator thereby recovering the vehicle's kinetic energy. Subsequent acceleration can, at least in part, be achieved by using the stored kinetic energy to drive the P/M as a motor. Hydraulic hybrid systems have this same capability with the addition of a hydraulic pump driven by the vehicle engine. This provides a more flexible system at the cost of increased complexity. Importantly it provides for still further improvements in fuel economy by optimising engine usage.

Hydraulic hybrid and SHEP vehicles have been the subject of many patents and technical papers. U.S. Pat. No. 3,903,696 shows a basic SHEP system, with U.S. Pat. No. 4,760,697 being a more complex version, and U.S. Pat. No. 4,242,922 describing the basics of a hydraulic hybrid, all incorporated herein by reference.

Published technical papers covering the use of SHEP and hybrid systems in automobiles, buses, garbage trucks, trains and other vehicles are typified by the following papers: Mechanical power regeneration system; "Simulation of a Hydraulic Hybrid Vehicle Power Train", ASME-Paper n 73-ICT-50, Sep. 23–27, 1973; "Practical Considerations for Energy-Storage Motor Vehicles", published by ASME, New York, N.Y., U.S.A. 1981; and "Studies of an Accumulator Energy-Storage Automobile Design with a Single Pump/Motor Unit, SAE Paper 851677 1985.

SUMMARY OF THE INVENTION

In its broad aspect, the hydraulic energy storage system of the invention for use in a vehicle comprises a high pressure accumulator, a first low pressure accumulator and a second low pressure accumulator in parallel, a pump/motor in fluid communication with the high pressure accumulator and with the first and second low pressure accumulators for pumping a fluid from the first and second low pressure accumulators to the high pressure accumulator when the pump/motor is driven in a pump mode and for returning fluid to the first and second low pressure accumulators when the pump/motor is in a motor mode, said pump/motor having a case for circulating fluid therethrough, a first check valve in series between the pump/motor and the second low pressure accumulator when the pump/motor is in the motor mode for unidirectional flow of a portion of fluid from the pump/motor to the second low pressure accumulator, a cooler in fluid communication in series between the case of the pump/motor, the second low pressure accumulator, and the pump/motor, and a second check valve in series between the second low pressure accumulator and the pump/motor case for unidirectional flow of fluid from the second low pressure accumulator through pump/motor case and the cooler to the pump/motor for cooling of said portion of the fluid when the pump/motor is in the pump mode.

More particularly, an embodiment of the hydraulic energy storage system of the invention for use in a vehicle comprises a high pressure accumulator, a first low pressure accumulator and a second low pressure accumulator in parallel, a pump/motor in fluid communication with the high pressure accumulator and with the first and second low pressure accumulators for pumping a fluid from the first and second low pressure accumulators to the high pressure accumulator when the pump/motor is driven in a pump mode and for returning fluid to the first and second low pressure accumulators when the pump/motor is in a motor mode, said pump/motor having a case for circulating fluid therethrough, a first check valve in series between the pump/motor, the pump case and a cooler for unidirectional flow of a portion of fluid from the pump/motor through the pump case and the cooler and a second check valve in series with the cooler and the second low pressure accumulator for unidirectional flow of said portion of fluid from the cooler to the second low pressure accumulator for cooling said portion of fluid when the pump/motor is in the motor mode, a third check valve in series with the second low pressure accumulator and the pump/motor and a fourth check valve in series with the cooler and the first check valve for unidirectional flow of a portion of fluid from the second low pressure accumulator to the pump/motor case and through the cooler to the pump/motor for cooling said portion of the fluid when the pump/motor is in the pump mode.

An embodiment of compensated accumulator for use in a hydraulic energy storage system for use in a vehicle comprises a cylindrical housing having a longitudinal axis and having a high pressure chamber and a low pressure chamber concentric with the longitudinal axis, a high pressure piston mounted transversely in the high pressure chamber for reciprocal axial travel in the high pressure chamber and a low pressure piston mounted transversely in the low pressure chamber for reciprocal axial travel in the low pressure chamber, and at least three equispaced rods connecting the high pressure piston to the low pressure piston for maintaining the pistons perpendicular to the longitudinal axis of the cylindrical housing during reciprocal travel.

Another embodiment of compensated accumulator for use in a hydraulic energy storage system for use in a vehicle comprises a cylindrical housing having a longitudinal axis with a high pressure chamber and a low pressure chamber concentric with the longitudinal axis, said low pressure chamber having a gas end remote from the high pressure chamber and a fluid end adjacent the high pressure chamber, a high pressure piston slidably mounted for reciprocal axial travel in the high pressure chamber and a low pressure piston mounted for reciprocal axial travel in the low pressure chamber, at least one connecting rod for connecting the high pressure piston and the low pressure piston together, a first position sensor mounted in the low pressure chamber adjacent the low pressure end and a second position sensor mounted in the low pressure chamber adjacent the high pressure end, whereby the first and second position sensors control reciprocal travel of the low pressure piston in the low pressure chamber. The compensated accumulator may additionally comprises a pressure sensor in fluid communication with the high pressure fluid chamber whereby the second position sensor or the pressure sensor controls reciprocal travel of the high pressure and low pressure pistons and actuates a heating system. The first position sensor may be mounted in the end wall and, preferably, is mounted in the end wall on the longitudinal axis and comprises an ultrasonic transducer.

Another embodiment of compensated accumulator for use in a hydraulic energy storage system for use in a vehicle comprises a cylindrical housing having a longitudinal axis and having a high pressure chamber and low pressure chamber concentric with said longitudinal axis, each said high pressure chamber and said low pressure chamber having a gas end remote from each other and a fluid end adjacent each other, a high pressure piston slidably mounted for reciprocal axial travel in the high pressure chamber and a low pressure piston slidably mounted for reciprocal axial travel in the low pressure chamber, at least one connecting rod for connecting the high pressure and low pressure pistons together in axial alignment, a valve block at one end of the cylindrical housing, and a high pressure conduit communicating the high pressure fluid end to the valve block and a low pressure conduit communicating the low pressure fluid end to the valve block. The high pressure and low pressure conduits can be external of the cylindrical housing. The high pressure and low pressure conduits can be internal of the cylindrical housing disposed parallel to the longitudinal axis and pass through the low pressure piston, sealing means being provided in the low pressure piston for slidably engaging and sealing the high pressure and low pressure conduits.

A further embodiment of compensated accumulator for use in hydraulic energy storage system for use in a vehicle comprises a cylindrical housing having a longitudinal axis and having a high pressure chamber and a low pressure chamber concentric with the longitudinal axis, one of said high pressure chamber and said low pressure chamber having a larger diameter than the other, a high pressure piston slidably mounted for reciprocal travel in the high pressure chamber and a low pressure piston slidably mounted for reciprocal travel in the low pressure cylinder, one of said high pressure piston and low pressure piston having a larger diameter than the other for creating a flow imbalance between the high pressure cylinder and the low pressure cylinder, a pump/motor in fluid communication with the high pressure chamber and with the low pressure chamber for pumping a fluid from the low pressure chamber to the high pressure chamber when the pump/motor is driven in a pump mode and for returning fluid to the low pressure chamber when the pump/motor is in a motor mode, said pump/motor having a case for circulating fluid therethrough, a low pressure accumulator in parallel with the low pressure chamber for receiving and discharging a portion of fluid from the high pressure or low pressure chambers due to the flow imbalance between the high pressure cylinder and the low pressure cylinder, during the pump mode or the motor mode, a cooler in fluid communication with the pump/motor casing, a first check valve in series between the pump/motor, the pump case and the cooler for unidirectional flow of a portion of fluid from the pump/motor through the pump case and the cooler and a second check valve in series with the cooler and the low pressure accumulator for unidirectional flow of said portion of fluid from the cooler to the low pressure accumulator for cooling said portion of fluid when the pump/motor is in the motor mode, a third check valve in series with the low pressure accumulator and the pump/motor and a fourth check valve in series with the cooler and the first check valve for unidirectional flow of a portion of fluid from the low pressure accumulator to the pump/motor case and through the cooler to the pump/motor for cooling a portion of the fluid when the pump/motor is in the pump mode. The high pressure piston preferably is larger than the low pressure piston whereby outflow from the high pressure chamber is greater than the inflow to the low pressure chamber for maintaining a high fluid pressure and for creating positive flow imbalance from the high pressure cylinder to the low pressure cylinder.

The low pressure accumulator may be an annular chamber formed concentric within the low pressure chamber and contain an annular accumulator piston, in the form of an elongated annular ring, slidably mounted for reciprocal travel in the annular accumulator chamber.

A still further embodiment of compensated accumulator for use in a hydraulic energy storage system comprises a cylindrical housing having a longitudinal axis and having a high pressure chamber and a low pressure chamber concentric with the longitudinal axis, a high pressure piston mounted transversely in the high pressure chamber for reciprocal axial travel in the high pressure chamber and a low pressure annular piston mounted transversely in the low pressure chamber for reciprocal travel in the low pressure chamber, at least three equispaced rods connecting the high pressure piston to the low pressure piston for maintaining the pistons perpendicular to the longitudinal axis of the cylindrical housing during reciprocal travel, a low pressure accumulator cylinder formed centrally in the low pressure chamber concentric with and within the low pressure annular piston, sealing means formed between the low pressure accumulator cylinder and the annular piston whereby the annular piston is in sliding engagement with the low pressure accumulator piston, a pump/motor in fluid communication with the high pressure chamber and with the low pressure chamber and the low pressure accumulator for pumping a fluid from the low pressure chamber and from the low pressure accumulator to the high pressure chamber when the pump/motor is in a pump mode and for returning fluid to the low pressure chamber and to the low pressure accumulator from the high pressure chamber when the pump/motor is in a motor mode, said pump/motor having a case for circulating fluid therethrough, a cooler in fluid communication with the pump/motor casing and the low pressure accumulator whereby the fluid flowing to and from the low pressure accumulator flows through the cooler when the pump/motor is in the pump and motor modes. Preferably, the high pressure chamber has a steel liner for reciprocal axial travel of the high pressure piston therein, said steel liner defining an annulus between the steel liner and the cylinder substantially the length of the piston stroke, substantially the length of the high pressure chamber and fluid conduit means interconnecting said annulus with fluid in the high pressure chamber for equalizing hydraulic pressure between the liner and the chamber.

Another embodiment of compensated accumulator having an atmospheric chamber at the distal end of the low pressure chamber in which the low pressure piston reciprocates comprises the piston having axial plunger extending therefrom, a surge reservoir for receiving fluid draining from a piston/motor, a cylindrical gallery formed in an end wall of the low pressure chamber for sealingly receiving the piston plunger and for receiving fluid from the surge reservoir for draining into the atmospheric chamber, and a fluid outlet in the bottom of the atmospheric chamber in communication with a low pressure accumulator or low pressure chamber through a check valve, whereby insertion of the piston plunger closes the atmospheric chamber to the atmosphere and compression of air in the atmospheric chamber opens the check valve to pump fluid in the bottom of the atmospheric chamber to the low pressure accumulator or low pressure chamber.

An alternative compensated accumulator having an atmospheric chamber at the distal end of the low pressure chamber in which the low pressure piston reciprocates comprises a surge reservoir for receiving fluid draining from a piston/motor, an opening formed in an end wall of the low pressure chamber for receiving fluid from the surge reservoir for draining into the atmospheric chamber, plunger means formed in the piston for closing said end wall opening, and a fluid outlet in the bottom of the atmospheric chamber in communication with a low pressure accumulator or chamber through a check valve, whereby reciprocal movement of the piston and plunger means closes the atmospheric chamber to the atmosphere and compression of air in the atmospheric chamber opens the check valve to pump fluid in the bottom of the atmospheric chamber to the low pressure accumulator or low pressure chamber.

A still further embodiment compensated accumulator having an atmospheric chamber at the distal end of the low pressure chamber comprises a spring return plunger pump is mounted in proximity to the top of the low pressure piston extending into the low pressure chamber for abutment with a barrier wall separating the low pressure chamber from the high pressure chamber, an inlet to the plunger pump from the low pressure chamber formed in the top of the low pressure piston, a normally-closed check valve in the inlet for undirectional flow from the low pressure chamber into the plunger pump and an outlet from the plunger pump to the atmospheric chamber, and a normally-closed check valve in the outlet for undirectional flow from the plunger pump to the atmospheric chamber, whereby abutment of the plunger pump against the barrier wall during reciprocal movement of the low pressure piston pumps any air present at the top of the low pressure chamber into the atmospheric chamber. The plunger pump may be mounted in the barrier wall and conduit means formed in the barrier wall direct pumped air to the atmosphere.

Another embodiment of compensated accumulator having an atmospheric chamber at the distal end of the low pressure chamber, in which the cylindrical housing has a barrier wall separating the high pressure chamber from the low pressure chamber, comprises a poppet valve sealed in a valve seat formed in the barrier wall and biased for normally-closed flow from the high pressure chamber to the low pressure chamber, said poppet valve having a stem projecting into the low pressure chamber, whereby abutment of the low pressure piston against the poppet stem opens the poppet valve to permit flow of high pressure fluid from the high pressure chamber into the low pressure chamber.

A still further embodiment compensated accumulator having an atmospheric chamber at the distal end of the low pressure chamber, in which the cylindrical housing has a barrier wall separating the high pressure compensated chamber from the low pressure chamber, comprises a poppet thumb valve mounted on the high pressure piston projecting towards the barrier wall, a valve seat for the poppet thumb valve formed on the barrier wall in fluid communication with the low pressure chamber for receiving the poppet thumb valve for closure before complete discharge or high pressure fluid from the high pressure chamber, and a servo supply port formed in the barrier wall in fluid communication with the pump/motor, whereby residual high pressure fluid in the high pressure chamber after closure of the poppet thumb valve is directed to the motor pump.

A unitized accumulator system comprises the compensated accumulator has been desired in which the cylindrical housing is incorporated with a valve block and with an overcentre-type pump/motor or non-overcentre-type pump/motor for a unitary structure for direct mounting to a vehicle final drive.

BRIEF DESCRIPTION OF THE DRAWINGS

The embodiments of the invention will now be described with reference to the accompanying drawings, in which:

FIG. 6 is a fragmentary longitudinal sectional view of a compensated accumulator with multiple connecting rods;

FIG. 7 is a sectional view of the compensated accumulator shown in FIG. 6 taken along line 7—7 thereof;

FIG. 9 is a fragmentary longitudinal sectional view of a compensated accumulator with valve block;

FIG. 10 is a sectional view of the compensated accumulator shown in FIG. 9 taken along line 10—10 thereof;

DESCRIPTION OF THE PREFERRED EMBODIMENTS

Figure 1:
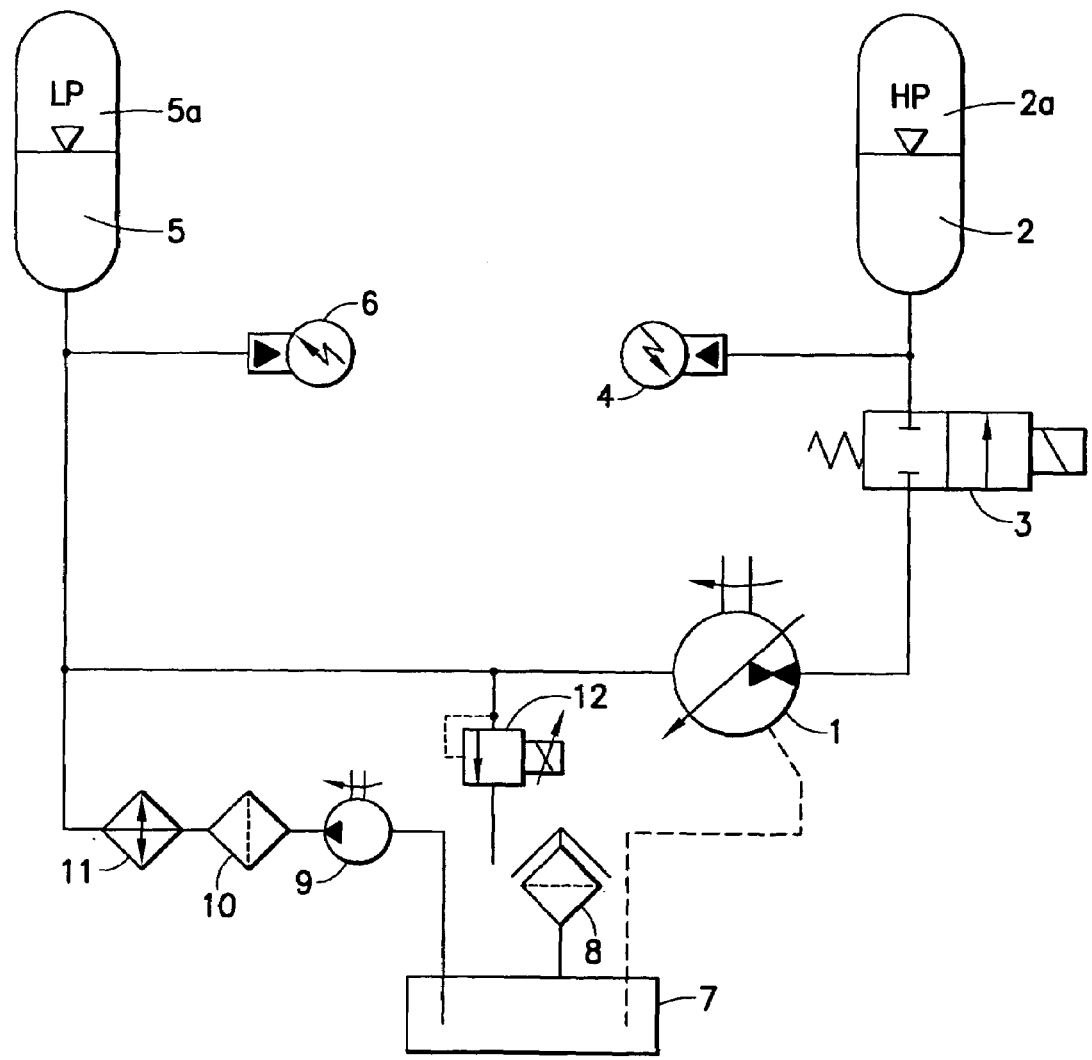
FIG. 1 is a schematic illustration of a prior art SHEP system with atmospheric fluid reservoir.

FIG. 1 shows a basic SHEP system, by way of example, consisting of a P/M unit which is connected to the drive train of a vehicle in a manner not shown, so that the P/M rotation is coupled to the vehicle motion. Energy is stored in the high pressure (HP) accumulator 2, which can be scaled off for longer term energy storage by shut-off valve 3. This accumulator typically has a pre-charge pressure of about 150 bar and a maximum pressure of about 350 bar but could have other pressure ratios. Pressure transducer inputs the HP value into the control system, not shown. Because the P/M unit is typically a high speed axial piston unit, it requires a charge pressure, typically about 10 bar, at its inlet when pumping if cavitation is to be avoided at higher speeds. This is provided by low pressure (LP) accumulator 5. Transducer 6 inputs the low pressure value into the control system. Fluid entering the HP accumulator 2 will compress the gas in chamber 2a, thus causing the pressure to rise. At the same time fluid must leave the LP accumulator, urged by the LP gas pressure in gas chamber 5a, so that the LP accumulator pressure must fall. The amount of fall depends on the relative sizes of the two accumulators. Normally the LP accumulator will be larger than the HP accumulator, so that the LP accumulator pressure range is less than on the HP accumulator side.

As the vehicle decelerates the HP accumulator pressure will rise and the LP accumulator pressure fall, and the converse as the vehicle accelerates. This means that normally the LP accumulator pressure will be lowest at low vehicle speeds, and P/M rotational speeds, and highest at high speeds. Within sensible limits, this is a beneficial effect as the P/M needs a higher inlet pressure at higher speeds to avoid cavitation when operating as a pump.

The P/M unit leaks some fluid into its case, which is drained away to reservoir 7, which is open to atmosphere through filter breather 8. This is required with many standard P/M designs as they are not suited to having any significant pressure in their case, being typically rated to 1 bar. This fluid is returned to the system by charge pump 9, delivering back to the LP accumulator side through filter 10 and cooler 11.

There are many ways that the charge pump can be operated. For example a level switch in the reservoir can switch the pump on as the reservoir becomes full. In this case the charge pump has a dual function of providing enough flow through the cooler to keep the system to an acceptable operating temperature as well as replenishing the P/M case leakage. If the required cooling flow is greater than the leakage, the pump must be kept on and its delivery circulated back through pressure control valve 12. This valve is controlled to ensure that the correct amount of fluid is stored in the LP accumulator to balance the fluid currently stored in the HP accumulator.

The charge pump has at all times to raise its delivery pressure from atmospheric to LP, which presents a considerable energy waste, reducing the overall efficiency of the storage system. In this configuration the P/M unit is capable of overcentre operation, so that it operates as a pump in positive displacement, causing deceleration of the vehicle and transferring fluid from the LP to HP accumulators. It operates as a motor in negative displacement, taking fluid from the HP accumulator. The torque of the motor is a function of the displacement value and the pressure difference, so that the driver's command is translated into a displacement value by the control system.

Other systems use a P/M unit that is only capable of one side of centre operation as typified in U.S. Pat. No. 4,760,697, which require some additional control valves to change from deceleration to acceleration.

It is advantageous to fill the gas volume of the HP accumulator with elastomeric foam as this makes its operation substantially isothermal, with a considerable improvement in efficiency and less problems with high gas temperatures. The use of foam in the LP accumulator has little effect on efficiency but assists in reducing temperatures.

The HP accumulator shown in FIG. 1 is defined as a bladder type with foam filling of the bladder in compartment 2a. This is the accepted art, but there are concerns about the long-term reliability of the bladder as it must deform not only itself but also the foam as the accumulator becomes charged.

Figure 2:
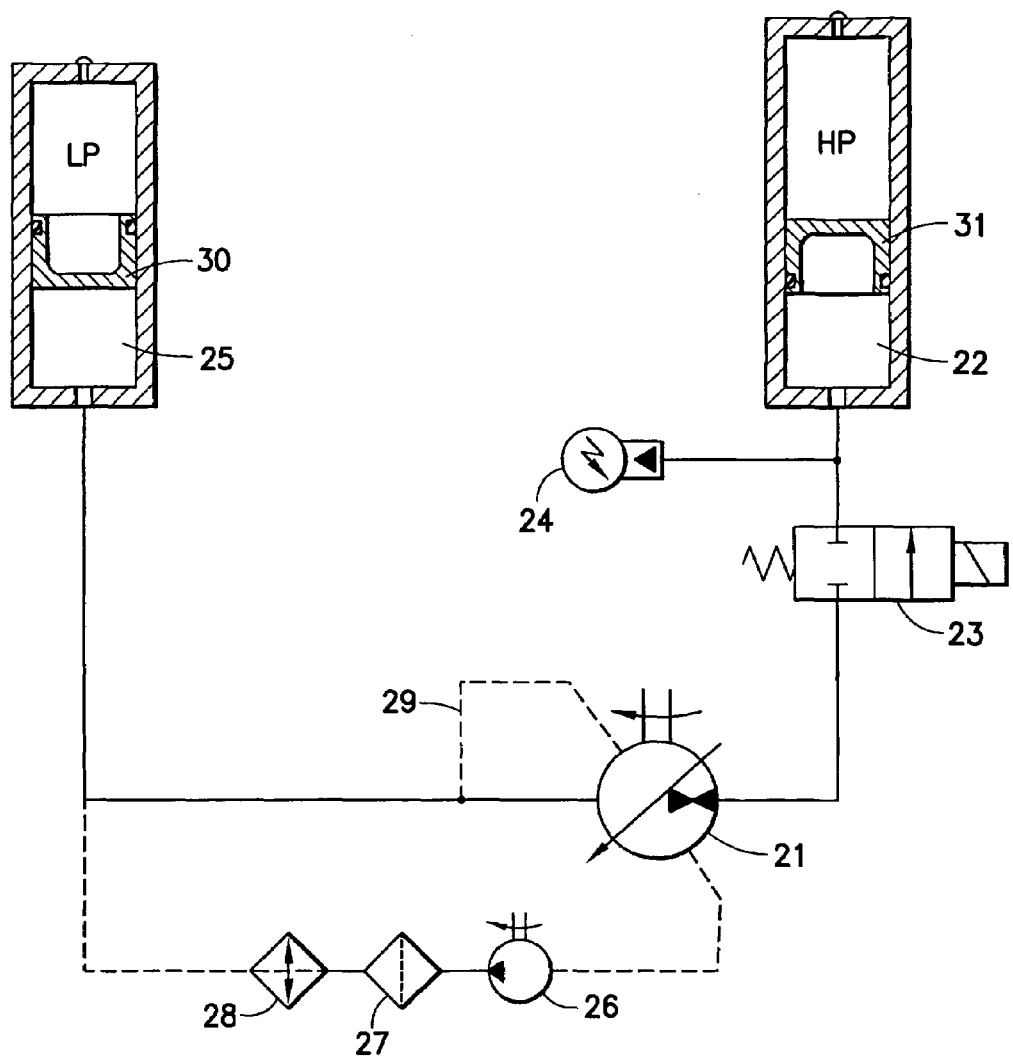
FIG. 2 is a schematic illustration of a prior art fully sealed SHEP system.

Ideally the foam is not permeable and should compress with the gas so that there is little gas flow though the interstices of the foam. Excessive flow could damage the foam and lead to some losses of efficiency. It is not possible to provide uniform compression with a collapsing bladder, possibly leading to deterioration of the foam and creasing failure of the bladder. FIG. 2 shows a similar SHEP system, but using a P/M that can take the LP in its case, up to about 10 bar. This is designated as a sealed SHEP system as it is sealed off from atmospheric pressure.

The P/M 21, HP accumulator 22, shut-off valve 23, transducer 24 and LP accumulator 25 act as described with reference to corresponding components in FIG. 1. In this case the circulating pump 26 has to only pump through the pressure drops of the filter 27 and cooler 28, resulting in a significant energy saving over the open SHEP system of FIG. 1. Conduit 29 provides for circulation flow through case of the P/M, which is often a requirement for operations at high rotational speeds. However, the circulating pump is typically driven off the vehicle electrical system, which is not an efficient route for energy; from alternator to battery, to electric motor and finally to the pump. The pump could be variable speed to minimise power usage depending on system temperature and minimum circulation requirements, which leads to control complexity and higher costs. The pump is also another potential source of noise.

The LP accumulator 25 is shown as a conventional piston type accumulator. The floating piston 30 has to be long enough to be stable and not cockle and jam in the bore. It is usual practice to hollow the piston out on the gas side to minimise overall accumulator length, as the gas is never fully compressed in any event. This construction is, however, not ideal for foam as the foam/gas in the piston recess will compress, requiring flow of foam/gas from the main gallery into the recess, which will lead to distortion of the foam matrix and result in gas flow through its interstices. The HP accumulator is shown with the piston 31 facing the other way, so that the foam/gas space compresses evenly. However there is now an unusable volume of fluid in the piston, requiring the accumulator be made longer.

The variation of LP accumulator pressure as the accumulator is charged and discharged with HP fluid is the same as discussed with the system of FIG. 1. In this case, however, the LP accumulator pressure also acts on the P/M case and on its shaft seal so that, in practice, the LP accumulator needs to be comparatively large to limit the maximum LP accumulator pressure within the ratings of the case and shaft seal. The P/M shaft seal is a critical component as it must remain leak free over the range of LP accumulator pressures and P/M rotational speeds. To be acceptable in an automotive environment, it must reliably retain the sealed integrity of the system for the life of the vehicle.

Figure 3:
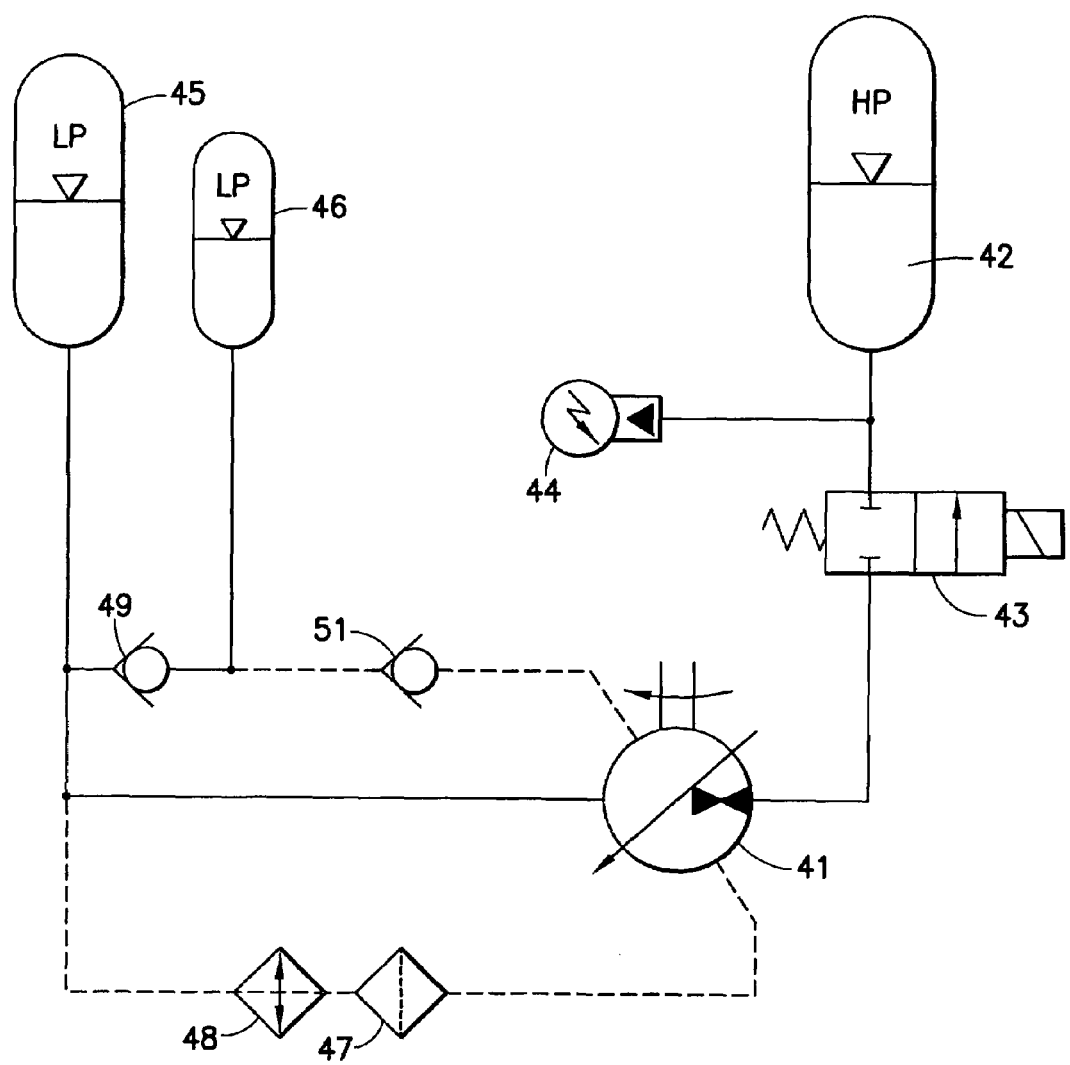
FIG. 3 is a schematic illustration of the use of tube LP accumulators with single direction cooling flow.

FIG. 3 shows an embodiment of the present invention that removes the need for the circulating pump in a sealed SHEP system by using two LP accumulators; a first large accumulator 45 and a second small accumulator 46. The P/M 41, HP accumulator 42, shut-off valve 43 and pressure transducer 44 are as in the previous figures. As the vehicle accelerates and the P/M is in the motor mode, fluid flows from the HP accumulator 42 through the P/M 41 to first large LP accumulator 45 and through check valve 49 to the second small accumulator 46.

During deceleration when the P/M is in the pump mode, the fluid flows from LP accumulators 45, 46 to the P/M to HP accumulator 42. The flow from the large LP accumulator 45 goes directly to the P/M, but the flow from the small accumulator is diverted through check valve 50, through the P/M case, filter 47 and cooler 48 before reaching the inlet of the P/M. This provides for circulation and cooling of a portion of the fluid during half the cycle. The check valves 49 and 50 can be reversed to provide circulation during acceleration if so desired. The only efficiency loss is the pressure loss through the filter and cooler, which can be sized to suit the actual cooling flow requirement, with the small accumulator is sized to provide that flow.

Figure 4:
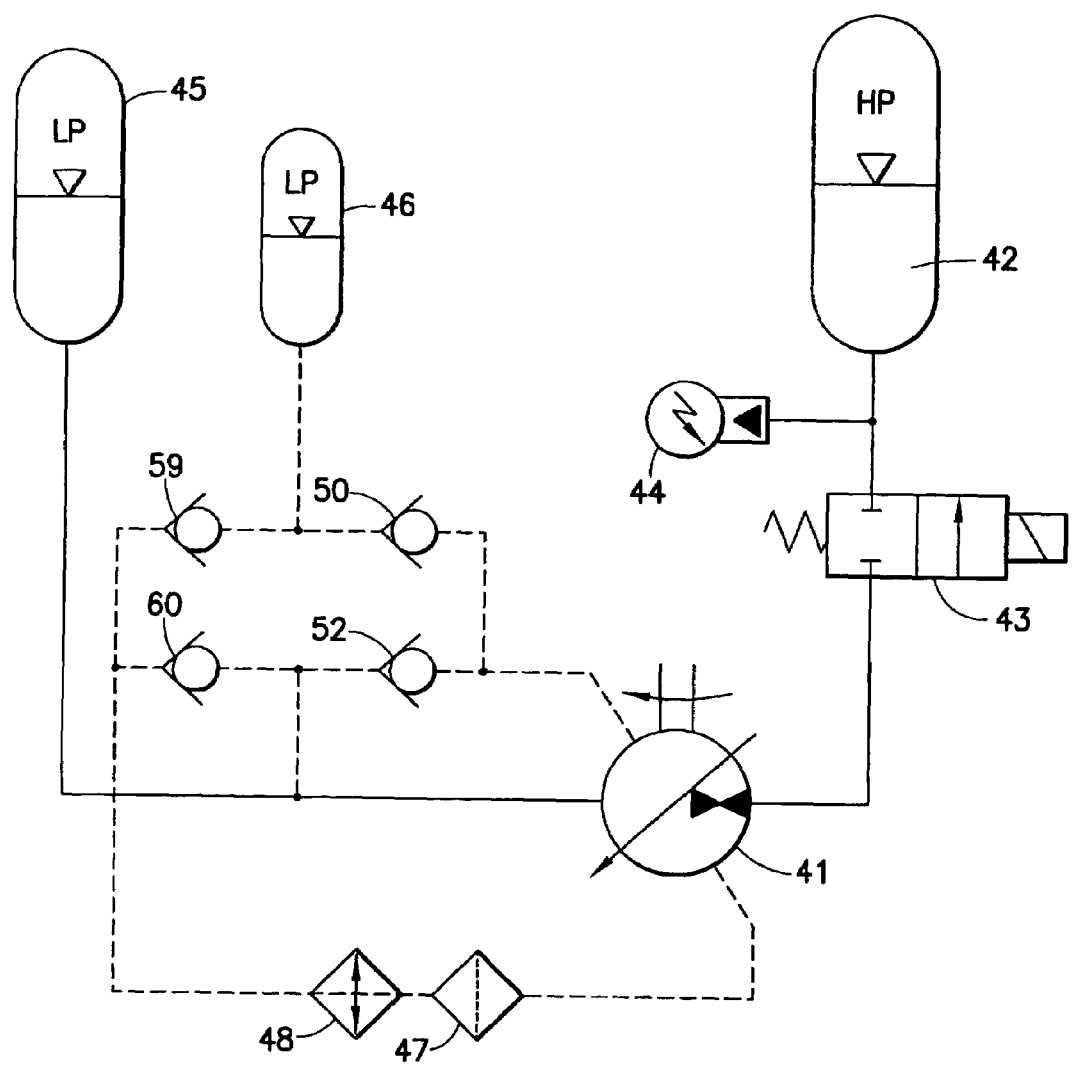
FIG. 4 is a schematic illustration of the use of two LP accumulators with dual direction cooling flow.

FIG. 4 shows a further embodiment that provides for circulation during both modes of operation. During acceleration when the P/M is in the motor mode, main flow of fluid is from HP accumulator 42 to LP accumulator 45, the circulating flow passes through check valve 52, the P/M case, filter 47, cooler 48, and check valve 59 to the small LP accumulator 46. During deceleration when the P/M is in the pump mode, main flow of fluid is from LP accumulator 45 to HP accumulator 42. The circulating flow passes from the small LP accumulator 46 through check valve 50, the P/M case, filter 47, cooler 48 and check valve 60 to the P/M inlet for transfer to HP accumulator 42. This effectively provides a circulation flow that is a small portion of the fluid flow but a substantially fixed proportion of the main flow. The more frequent flow through the cooler, as compared with FIG. 3, means that the cooler can be smaller, with a smaller flow requirement, leading to a smaller small accumulator 46.

A compensated or pressure compensated accumulator effectively combines high and low pressure into one assembly so that the flow into the HP side is off-set by the flow from the LP side. Essentially it consists of two piston accumulators placed together axially with the pistons joined with a connecting rod. U.S. Pat. No. 2,721,446 and U.S. Pat. No. 3,918,498, incorporated herein by reference, describe such a device. In its simplest form it obviates the need for the LP accumulator as flow into the HP accumulator is fully off-set by flow from the LP piston.

Figure 5:
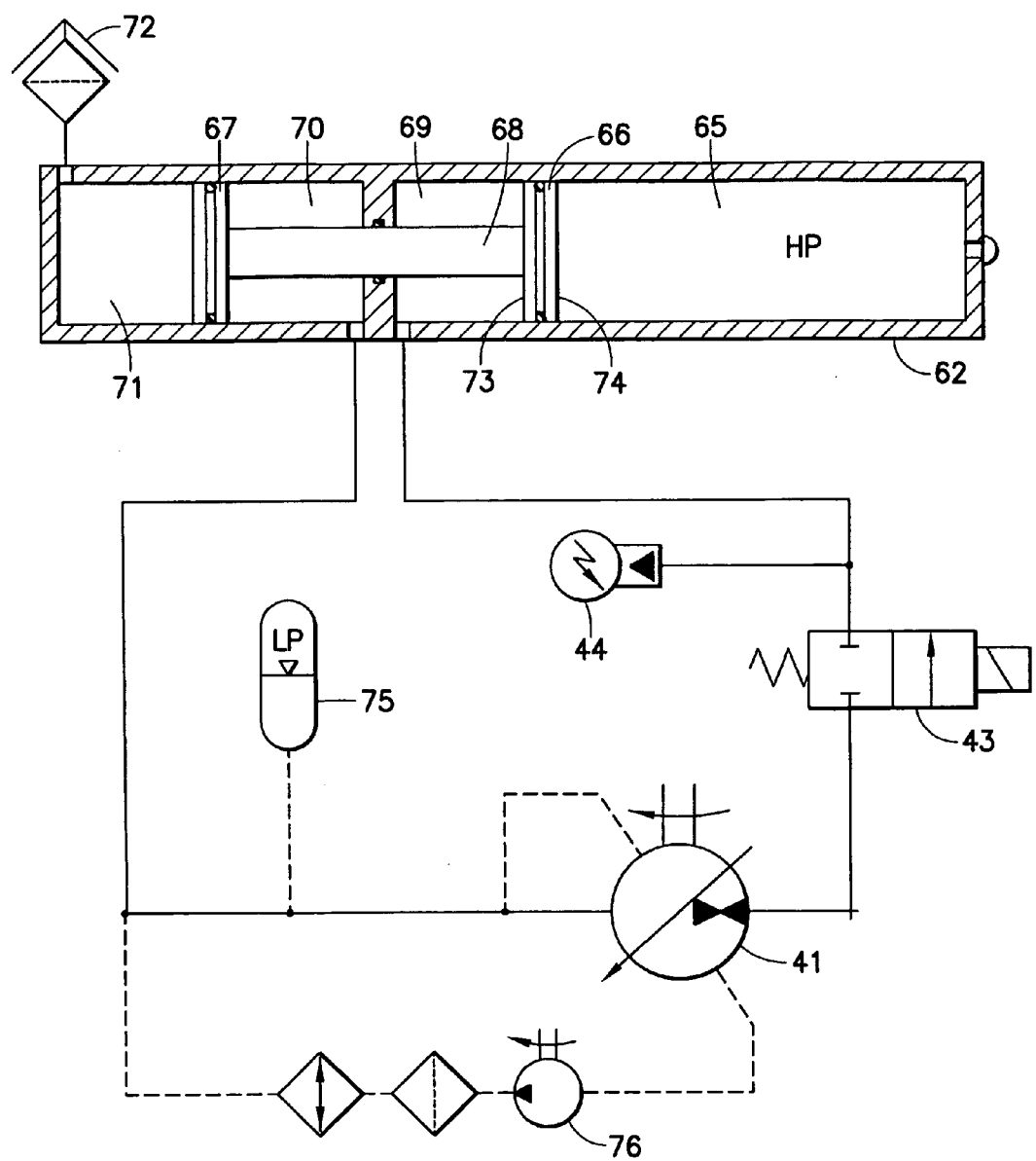
FIG. 5 is a schematic illustration of a SHEP system showing a longitudinal sectional view of a compensated accumulator.

FIG. 5 shows a SHEP system using a compensated accumulator 62, P/M 41, shut-off valve 43 and pressure transducer 44 as before. The compensated accumulator 62 consists of a cylindrical housing construction enclosing a pre-charged gas/foam filled high pressure chamber 65, with a reciprocally moving piston assembly consisting of a HP piston 66, LP piston 67 and axial connecting rod 68, all with seals as shown. Chamber 69, to the left of the HP piston as viewed in FIG. 5 is connected to the SHEP HP fluid side, while chamber 70, to the right of the LP piston, is connected to the SHEP LP fluid side. Chamber 71, to the left of the LP piston, is connected to atmosphere through filter breather 72. The cylindrical shape of the HP foam/gas chamber is ideal in that the gas and foam can be readily compressed together without distortion of the foam matrix or flow of gas through the foam interstices.

Flow of HP fluid into the accumulator HP chamber 69 will cause the piston assembly to move to the right, displacing an equal volume of fluid out of the LP port 78, and drawing air in through the breather 72. Conversely, flow of HP fluid out of the accumulator 62 will cause the piston assembly to move to the left, drawing an equal volume of LP fluid in to LP chamber 70, and pushing air out through the breather 72. A small LP accumulator 75 is required to ensure that a suitable charge pressure is maintained at the P/M inlet and to compensate for volume variations due to changing system temperature and other factors. There is no flow in and out of this accumulator during a normal deceleration and acceleration cycle, so a circulating pump 76 is required. In contrast to the equivalent system illustrated in FIG. 2, there is no variation of LP as the accumulator is charged and discharged, which means that the LP accumulator pressure has to be at all times high enough for the P/M at its highest operating speed.

The piston area 73, on the left side of the HP piston, is less than area 74, on the right side, due to the presence of the connecting rod 68. The connecting rod is held in slight tension by the low pressure in LP chamber 70 acting on the right side of the LP piston. The force balance of the piston assembly means that the HP fluid pressure will always be slightly higher than the HP gas pressure, by an amount depending primarily on the relative size of the connecting rod. The smaller the diameter of connecting rod, the smaller the difference between the fluid and gas pressures. A fluid pressure higher than the gas pressure is beneficial, within sensible limits, as the piston seal will always act in the same direction regardless of the direction of piston movement, it will be better lubricated and it is easier to seal a relatively high viscosity fluid rather than a low viscosity gas.

The pistons 66 and 67 can be short in length, as compared with pistons 30 and 31 (FIG. 2), because they are stabilised by being joined by connecting rod 68, providing that the rod is both of sufficient diameter and adequately connected to provide stable support of the pistons. In practice this means that the connecting rod needs be larger than required to simply resist the small tensile force from the LP acting on the LP piston. The compensated accumulator provides for a reduction in overall package size, by about 25% by volume, as the pistons can be shorter than those shown in FIG. 2 and the considerable LP gas volume is not required.

FIGS. 6 and 7 show a construction for a compensated accumulator with the central connecting rod 68 of FIG. 5 replaced by three small diameter equispaced connecting rods 81. This provides for stable support of the pistons 82 and 83, so that they may remain short in length, while achieving a small total connecting rod cross-sectional area. The small cross-sectional area of the connecting rods reduces the difference in effective area, so that the area 84 on the fluid side of the HP piston 82 is only slightly less than the area 85 on the gas side, with the result that the fluid pressure is only slightly higher than the gas pressure to achieve a force balance. Typically, a pressure difference of about 10 bar with a maximum accumulator pressure of 350 bar can be achieved. This is considered ideal to provide for stable seal performance with minimum friction and wear.

It will be understood that more than three connecting rods can be used if required to meet a convenience of construction. A typical SHEP installation will have the accumulator lying horizontal, as this attitude is most easily accommodated within the vehicle structure. Most accumulators used for industrial energy storage are mounted vertically. The construction illustrated in FIG. 7 has a further advantage in maintaining the rotational position of the pistons which permits the installation of attitude sensitive devices in the pistons, that would otherwise have to be installed in the accumulator housing.

Gas type accumulators are temperature sensitive. The pressure of elastomeric foam effectively minimises the effects of temperature rise from compression, but the ambient temperature of an accumulator in an automobile can vary widely depending on the current weather conditions and other factors such as the proximity of the exhaust system and the heat transfer from the hydraulic fluid to the gas. Taking for example an energy storage system that has a design pressure range of 175 to 350 bar, the P/M is sized to provide the required traction at full displacement at 175 bar, with less displacement being used at higher pressures. Pressures less than 175 bar would not provide the design traction, but can still provide some useful energy in parallel to the engine-driven vehicle drive system. Conventional control using a HP accumulator pressure transducer would assume that the accumulator was empty when the pressure fell to 175 bar, so this energy is not available.

If the HP gas is pre-charged to 175 bar at for example 60° C., the design working temperature, the pre-charge pressure will be about 135 bar at 0° C., giving a useful storage capacity of only 75% of design if only the range from 175 to 350 bar is used. If the full displacement of the accumulator can be used from 135 bar to 350 bar, there is actually more energy available than when operating at design temperature, but with available traction falling off to 75% as the accumulator fully discharges.

Figure 8:
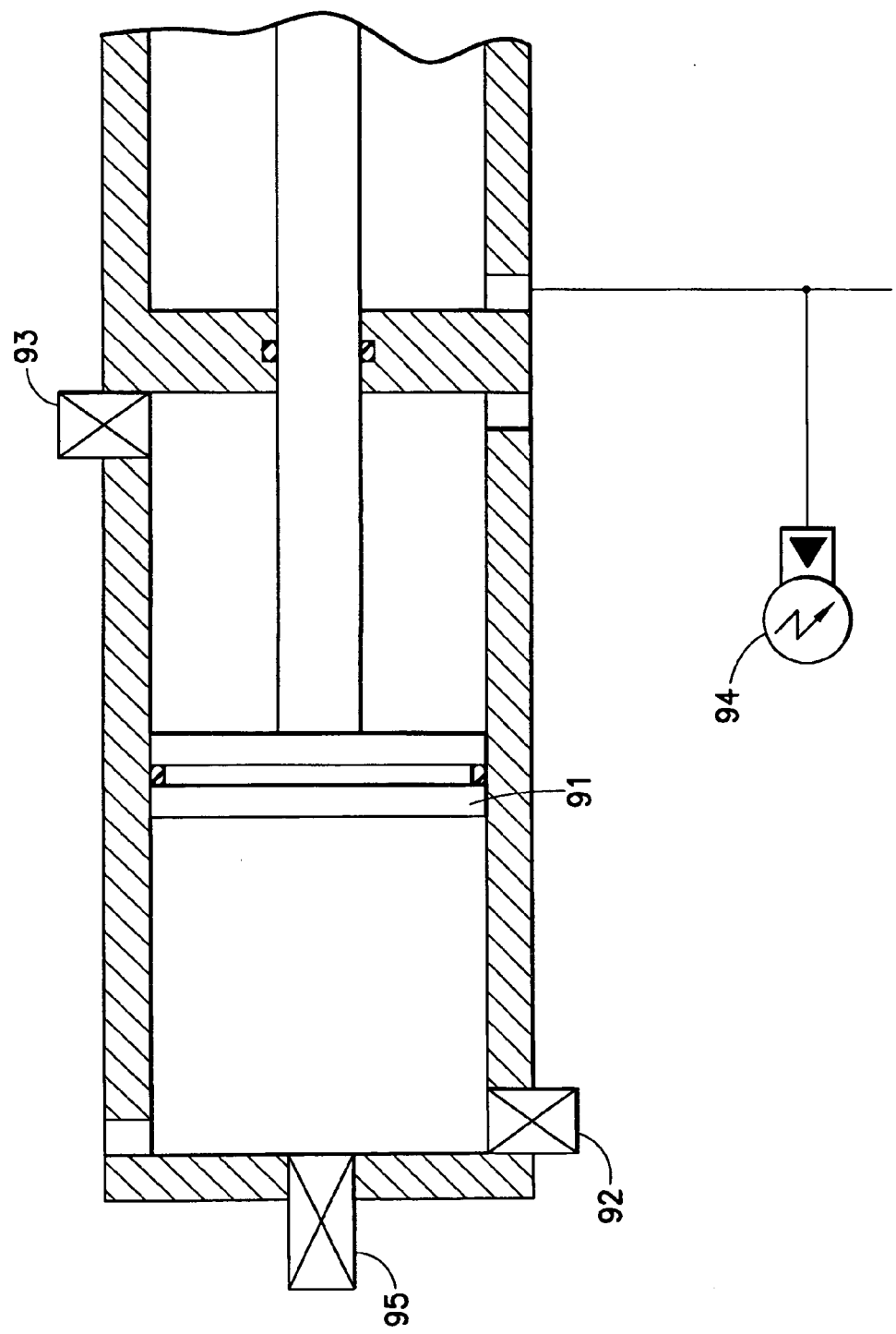
FIG. 8 is a fragmentary longitudinal sectional view of a compensated accumulator with position seasoning

The variation in the low cut-off of HP accumulator usage makes it difficult to use a pressure transducer for control FIG. 8 shows a compensated accumulator incorporating position sensors for control purposes in either the atmospheric chamber or the LP fluid chamber. The use of proximity switches in a bladder type HP accumulator is impractical, and difficult in a piston type due to the high pressures.

The LP piston 91 moves to the left as viewed in FIG. 8 as the stored energy accelerates the vehicle until triggering sensor 92, indicating that the accumulator is empty. During deceleration, the piston 91 moves to the right until either sensor 93 is triggered indicating that the accumulator is full or pressure transducer 94 signals that the maximum allowable pressure has been reached. This combination of position sensors and pressure tansducer provides for the maximum usage of the accumulator over a range of temperature conditions. Under very cold conditions, a LP transducer reading when the accumulator is empty, as indicated by sensor 92, can be used to bring in a gas heating system, not shown, as typified in U.S. Pat. No. 4,367,786, using engine coolant or exhaust. The position sensors 92 and 93 can be of any known type. Alternatively, a longer range position transducer 95, such as of the ultrasonic type, can be used.

It is advantageous for a SHEP or hydraulic hybrid system to be packaged as a single sealed unit that can be installed in the vehicle as a fully assembled and tested hardware component; and not installed piece by piece as with a normal hydraulic system with connecting pipework installed subsequently, the system then having to be filled with fluid, pressure charged, bled of air and test run. FIGS. 5, 9 and 10 show a compensated accumulator 100 with conduits 101 and 102 connecting the accumulator ports to a valve block 103 which contains all the valves required for the SHEP system.

Figure 11:
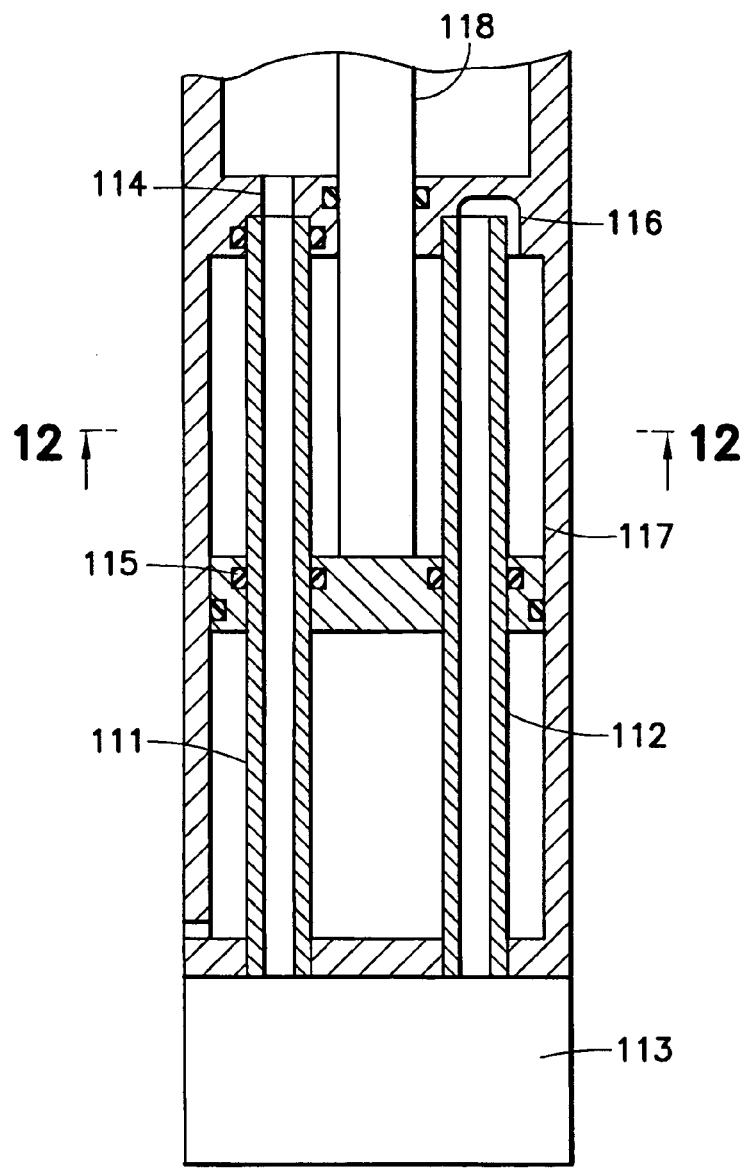
FIG. 11 is a fragmentary longitudinal sectional view of a compensated accumulator with internal connections.
Figure 12:
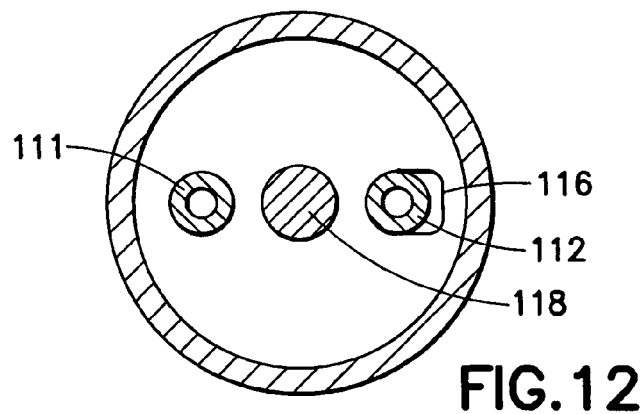
FIG. 12 is a sectional view of the compensated accumulator shown in FIG. 11 taken along the line 12—12 thereof.

FIGS. 9 and 10 show the conduits 101,102 in the corners 103, 104 respectively of the assembly so that the overall package dimension is not increased. FIGS. 11 and 12 show a similar arrangement with the conduits, located inside the compensated accumulator passing through piston 120 to make a more compact and neater looking package. High and low pressure conduits 111 and 112 are connected lo the valve block 113. The HP conduit 111 is communicated to the HP side of the accumulator though passage 114. A seal 115 in the LP piston 120 encircling conduit 111 prevents leakage as the piston is reciprocated by connecting rod 118.

The LP conduit 112 is communicated to the LP side of the accumulator through passage 116. A seal 119 in the LP piston 120 encircling conduit 112 prevents leakage as the piston reciprocates. The diameter of the LP chamber 117 can be made larger than the diameter of the HP chamber, as illustrated, to provide an equal piston area with the inclusion of the conduits.

Figure 13:
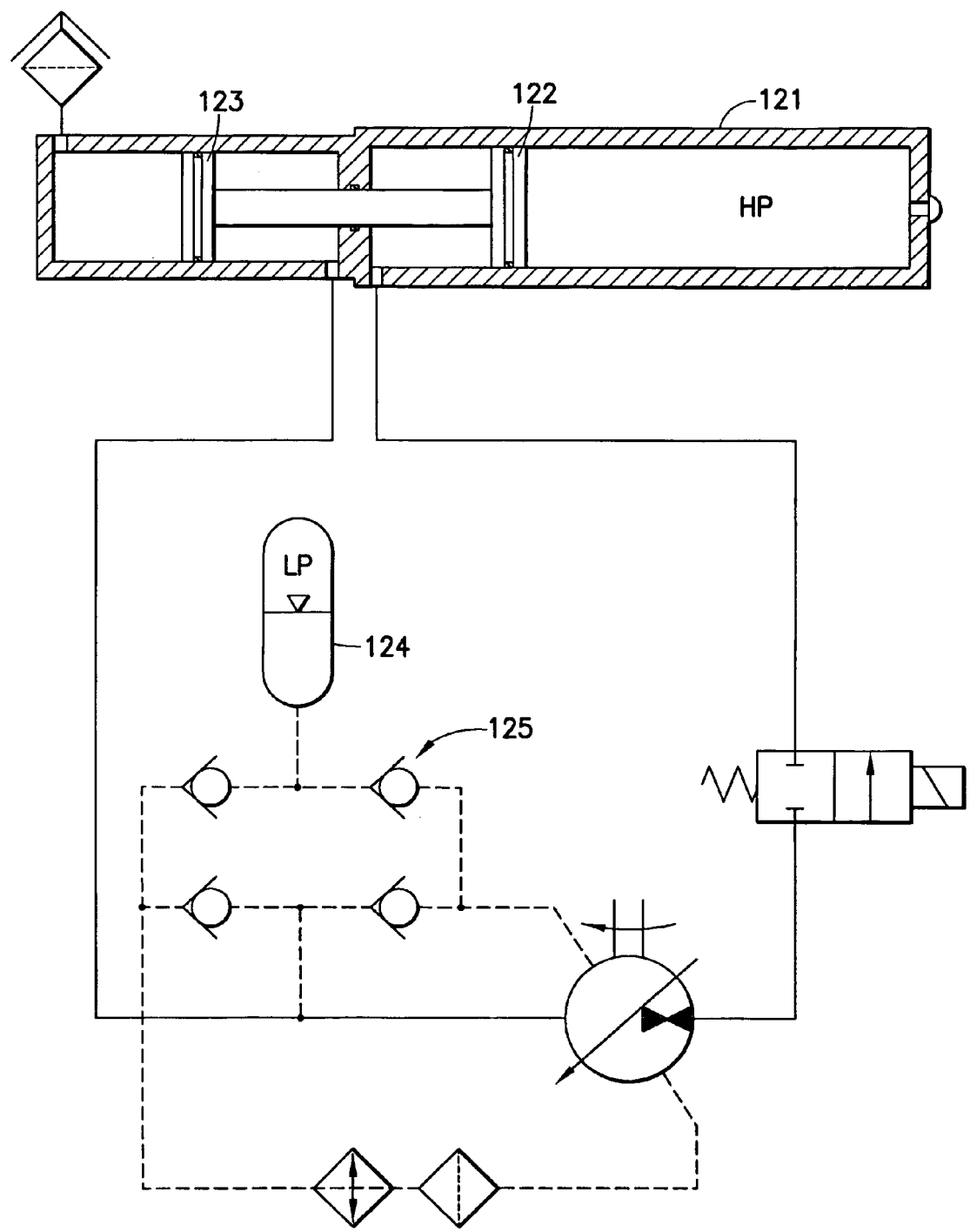
FIG. 13 is a schematic illustration of a SHEP system with a longitudinal sectional view of an unbalanced compensated accumulator.

FIG. 13 shows a compensated accumulator 121 in which the HP piston 122 is larger than the LP piston 123. This means that as the accumulator is charged during vehicle deceleration, the inflow to the HP side is not fully compensated by the outflow from the LP side, with the difference being made up by a small accumulator 124. Similarly, as the accumulator is discharged during acceleration, the outflow from the HP is greater than the inflow to the LP, with the difference going to the small accumulator.

The four check valve group 125, described above with reference to FIG. 4, operates so that all flow into and out of the small accumulator passes through the P/M case, the filter and the cooler, thus avoiding the need for a circulating pump. The difference in piston diameters and the size of the small accumulator can be selected to provide any desired amount of circulation and a reasonable increase in P/M inlet pressure as the main accumulator discharges to accelerate the vehicle. The circulation process would operate equally well if the LP piston were to be larger than the HP piston, as only a difference in their sizes is required, but the change in P/M inlet pressure would then decrease as the main accumulator discharges, which would be a less favoured option.

Figure 14:
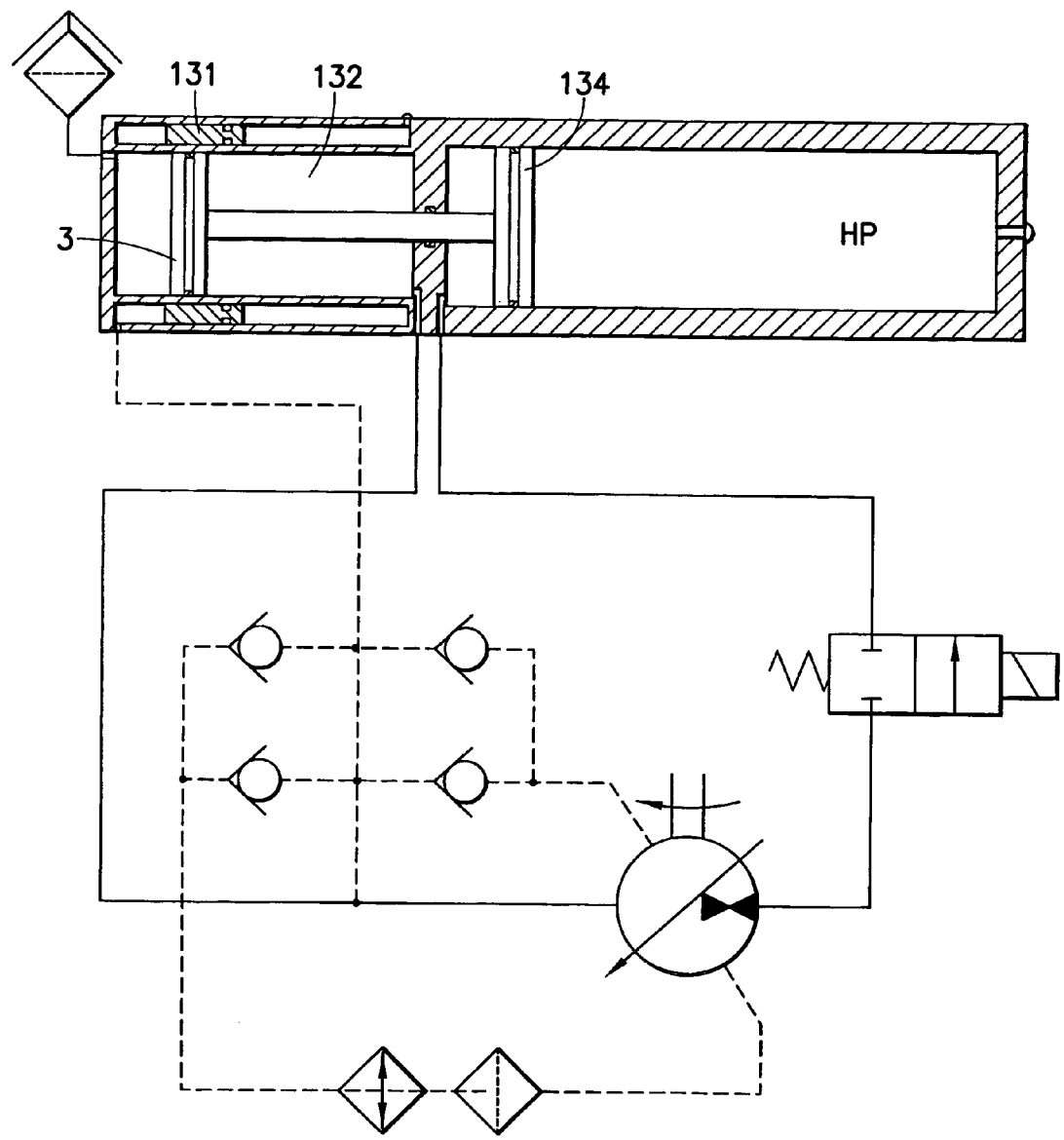
FIG. 14 is a schematic illustration of the SHEP system shown in FIG. 9 with a longitudinal sectional view of an external concentric LP accumulator and unstressed HP liner.

The system of FIG. 13 requires a small accumulator that is awkward to fit into a unitary construction. FIG. 14 shows an annular small accumulator piston 131 that is integral and concentric with the LP end of the compensated accumulator 132. The small accumulator piston 131 is an annular ring reciprocally mounted in annular 135 and has be of sufficient length to be stable and not cockle in its annular cylinder. This assembly can be achieved without significantly increasing the package dimensions both because the LP piston 133 is smaller than the HP piston 134 and because the HP end has lo be constructed with a thicker wall than the wall thickness of the LP end to withstand the high pressure.

Figure 15:
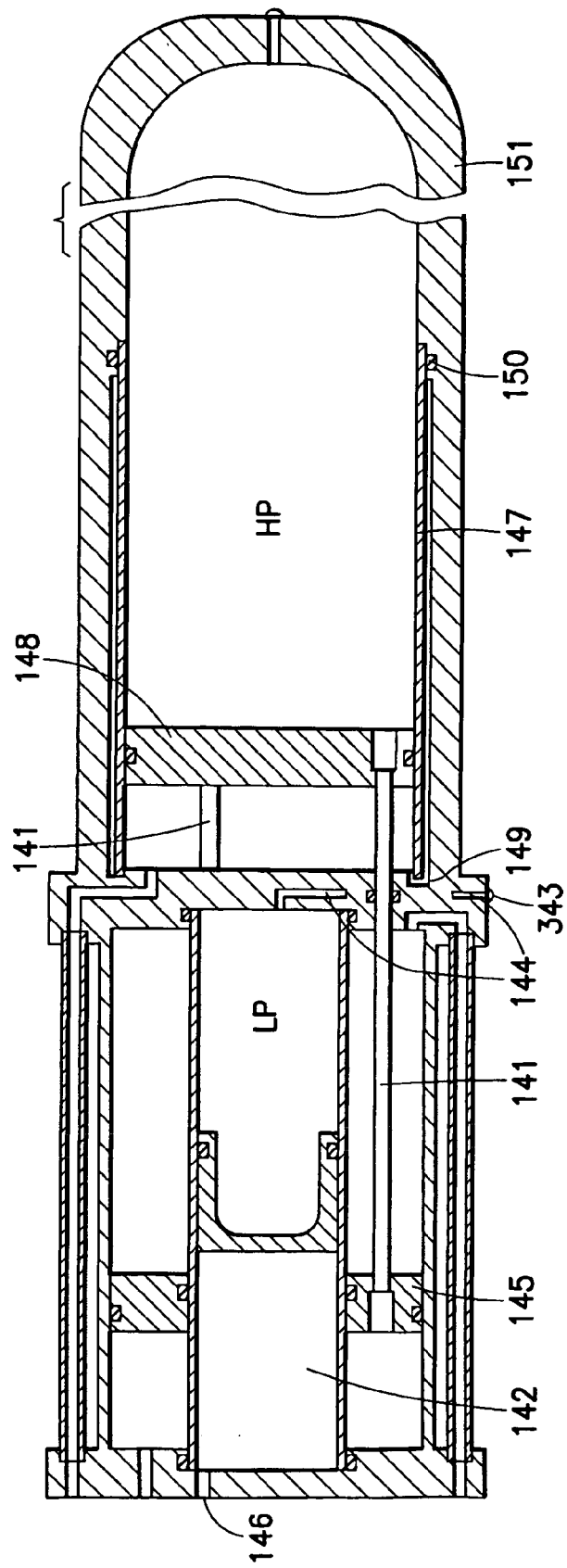
FIG. 15 is a longitudinal sectional view of an internal concentric LP accumulator and unstressed HP liner.

FIG. 15 shows another embodiment of the invention using the multiple connecting rods 141 of FIGS. 6 and 7 with the small accumulator 142 mounted concentrically inside the LP piston 145 of the compensated accumulator. A small accumulator gas pre-charge, typically about 5 bar, is inserted through the charge valve 143 and passages 144. The LP piston 145 is shown as an annular ring and can be short in length as it is held stable by the equispaced connecting rods 141. The integration of the LP chamber integrated into the centre of the LP accumulator eliminates the need for a separate LP accumulator to generate cooling flow. Flow from this central chamber is directed through the pump/motor case during both the accelerating and braking modes.

The small accumulator access port 146 is intentionally positioned at the top of the accumulator cylinder 142 to prevent air collecting. The small accumulator is shown with the gas connection at the centre plate of the compensated accumulator. It can be reversed with the gas connection at the end plate if this is convenient to a particular construction. The small accumulator is shown concentric to the LP piston and cylinder, but may be positioned off-centre if this is convenient to a particular construction.

U.S. Pat. No. 2,764,999 shows in FIG. 2 and U.S. Pat. No. 4,714,094 shows in FIG. 3 accumulator constructions in which the HP gas acts on the outside of the cylinder tube so that it is essentially free of stress, both of which are incorporated herein by reference. This construction, particularly of the latter disclosure, would be the preferred construction for SHEP applications were it not for the need to use elastomeric foam in the HP gas cylinders.

FIG. 15 illustrates a preferred construction for the HP end of the compensated accumulator suitable for the use of foam. A honed steel liner 147 provides the bore for the reciprocation of the sealed HP piston 148. In a conventional design this is part of the pressure vessel 151 construction and will expand under pressure providing an increased extrusion gap for the seal, and will be subject to any distortions that may either occur during manufacture or subsequently due to mountings or other external forces. In this embodiment, HP fluid, rather than gas as taught in the references, is connected to the outside of the liner through connecting galleries, such as designated by numeral 149, so that the hydraulic pressure acts equally on the outside of the liner, thus rendering it essentially free of stress Obviously this can also be applied to single piston accumulators. The construction illustrated shows the liner having the length of the HP piston stroke with seal 150 separating the fluid from the gas. Depending on the conveniences of construction, the liner can extend the fill length of the HP chamber. The seal can be replaced by an adhesive bond between the liner and pressure vessel 151, particularly if the pressure vessel is of composite construction. The provision of some circulation of the fluid between the liner and pressure vessel can be used to heat up the HP gas with the hydraulic fluid, to both improve the storage capacity of the accumulator and provide some cooling for the hydraulic system.

Hydraulic systems are prone to external leakage of hydraulic fluid; and great care must be taken with the system design and installation to provide a reliable solution. A SHEP system must be free of external leakage for the life of the vehicle. One of the strategies used to minimise leakage possibilities is to minimise all external dynamic seals and make sure that those that are unavoidable only seal at low pressure, preferably atmospheric pressure. Atmospheric seals can provide the same level of reliability as the engine and gearbox shaft seals conventionally used for road vehicles.

In the context of a SHEP sealed system with compensated accumulator, as described herein, there are two external dynamic seals, being the P/M shaft seal and the LP piston seal. Both of these seals are exposed to the LP at about 10 bar. The shaft seal is the most critical as it is a considerable challenge to make a rotating seal that will provide drip-free performance at such a pressure for years; both rotating and stationary, over a range of operating temperatures. It is a much easier task to provide a seal that may have some weepage.

Figure 16:
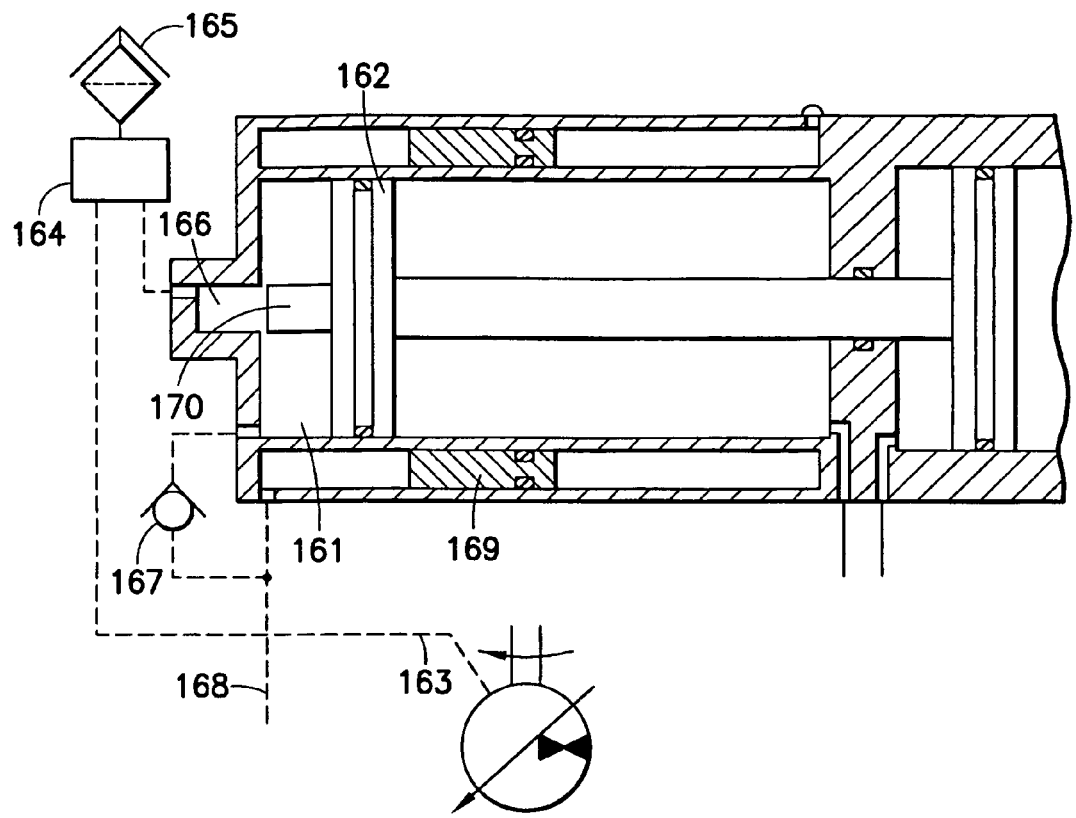
FIG. 16 is a fragmentary longitudinal sectional view of a recharge compression pump for sealed system.
Figure 17:
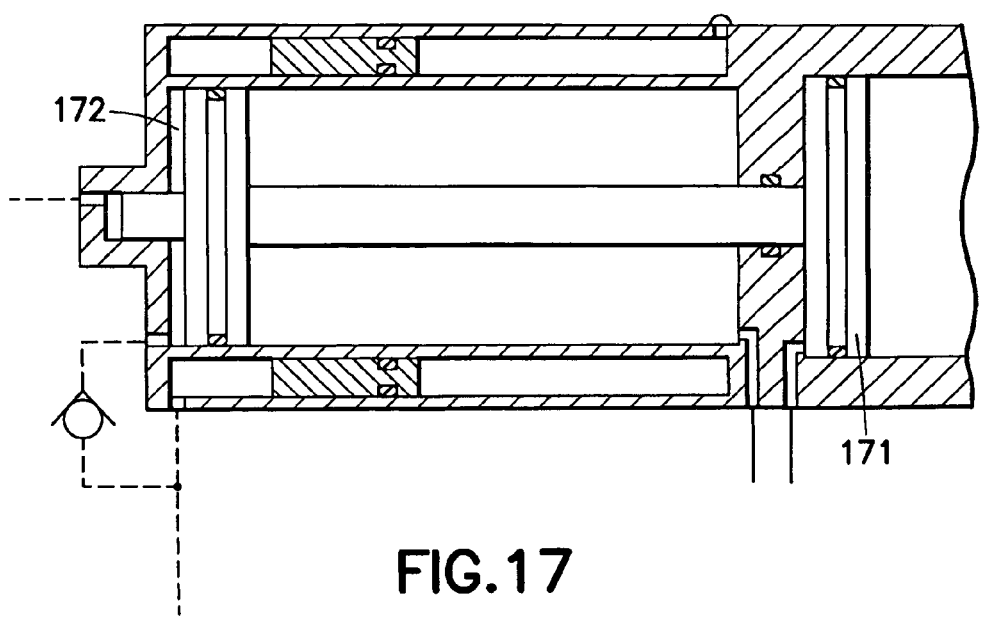
FIG. 17 is a fragmatary sectional view of the recharge compression pump shown in FIG. 16 in a closed position.

In this situation, it is common practice to have a second seal with a drain returning to an atmospheric reservoir. However a sealed SHEP system (as shown in FIG. 2 for example) does not have an atmospheric reservoir or a recharge pump to return seal weepage to the hydraulic system. FIGS. 16 and 17 illustrate a means for overcoming this shortcoming by using the atmospheric chamber 161 of a compensated accumulator as an atmospheric reservoir and the reciprocating action of the LP piston 162 to function as a recharge pump. An atmospheric drain 163 is provided on the P/M, by using a second shaft seal in a manner not shown but well known to rotary seal designers, which is connected to a surge reservoir 164, preferably integral with filter breather 165. The surge reservoir drains into gallery 166. Any leakage from the pressure shaft seal of the P/M, together with any leakage of the LP piston, will then collect in the bottom of the atmospheric chamber 161.

The check valve 167 provides a connection from the atmospheric chamber into the LP side 168, connected to the small accumulator 169. The check valve 167 is normally held closed by the LP pressure. By preference the check valve should be of soft-seated design to be itself free of leakage. The LP piston moves to the left as the accumulator storage is discharged. A plunger 170 is formed in the end of the LP piston that engages in sealing fashion with gallery 166. FIG. 16 shows the piston position just before the gallery is closed off. Once the gallery is closed off, the remaining volume in chamber 161 is closed off and further travel of the piston to the left as viewed in FIG. 16 will compress the air with any fluid therein.

FIG. 17 shows the compensated accumulator fully discharged, with the HP piston 171 at the left end of its travel. The final volume 172 at the atmospheric chamber is designed to give a compression ratio of about 4:1 after it is initially sealed off and isolated by the plunger 170. If there is no fluid present from leakage, the gas in the remaining volume will be compressed to produce a pressure of about 6 bar, not enough to open the check valve 167 against LP, so that no gas will be forced into the hydraulic system. If there is fluid present from leakage, the volume of air will be reduced, but the change in volume remains essentially the same, so the compression pressure will increase, until it reaches a value equal or greater than LP pressure, at which time some of the fluid in the bottom of the atmospheric chamber will be forced back into the hydraulic system. This provides an automatic recharge system. The surge reservoir functions to store any leakage that might occur during the time that the main accumulator is fully discharged and there is no access to the atmospheric chamber.

The same system can also be applied to an open reservoir SHEP system (as shown in FIG. 1 for example) to recirculate the case drain flow from a P/M with an atmospheric pressure case, as illustrated with reference to FIG. 18. The P/M case drain 181 goes to the atmospheric reservoir 182. Overflow 183 passes to the atmospheric chamber 184 to be pumped back into the LP accumulator 186 through check valve 185. Accumulator 186, in combination with orifice 187, acts both to maintain the LP pressure and to smooth the pulsating delivery, for each charge and discharge cycle from the compression pump system. This system has the advantage of automatically only pumping the case drain flow as it occurs.

Figure 18:
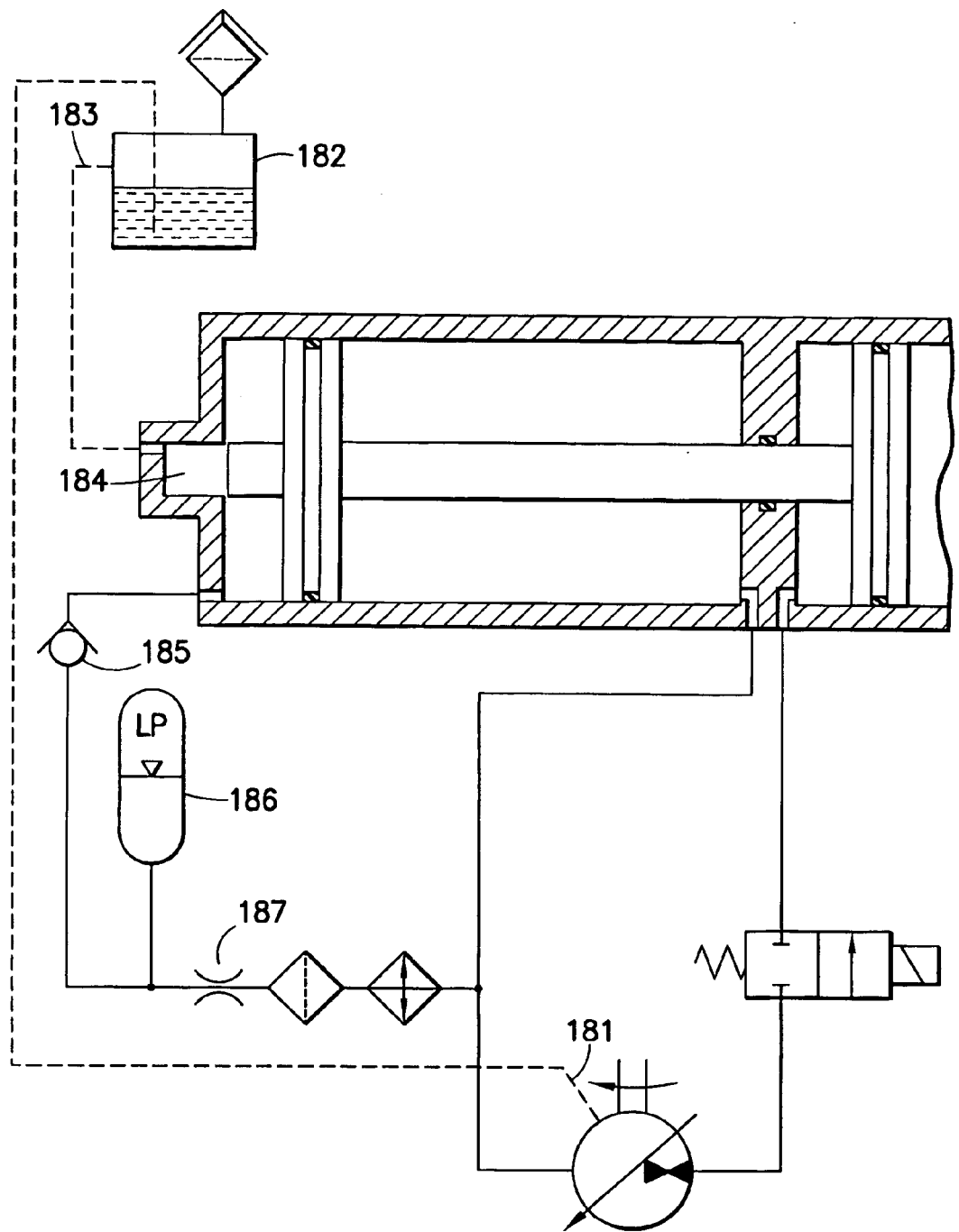
FIG. 18 is a schematic illustration of an atmospheric reservoir system with a fragmentary longitudinal sectional view of a recharge compression pump.

FIG. 18 shows the compensated accumulator with equal piston diameters, but unequal piston diameters can be used if the case drain flow does not provide sufficient circulation.

Figure 19:
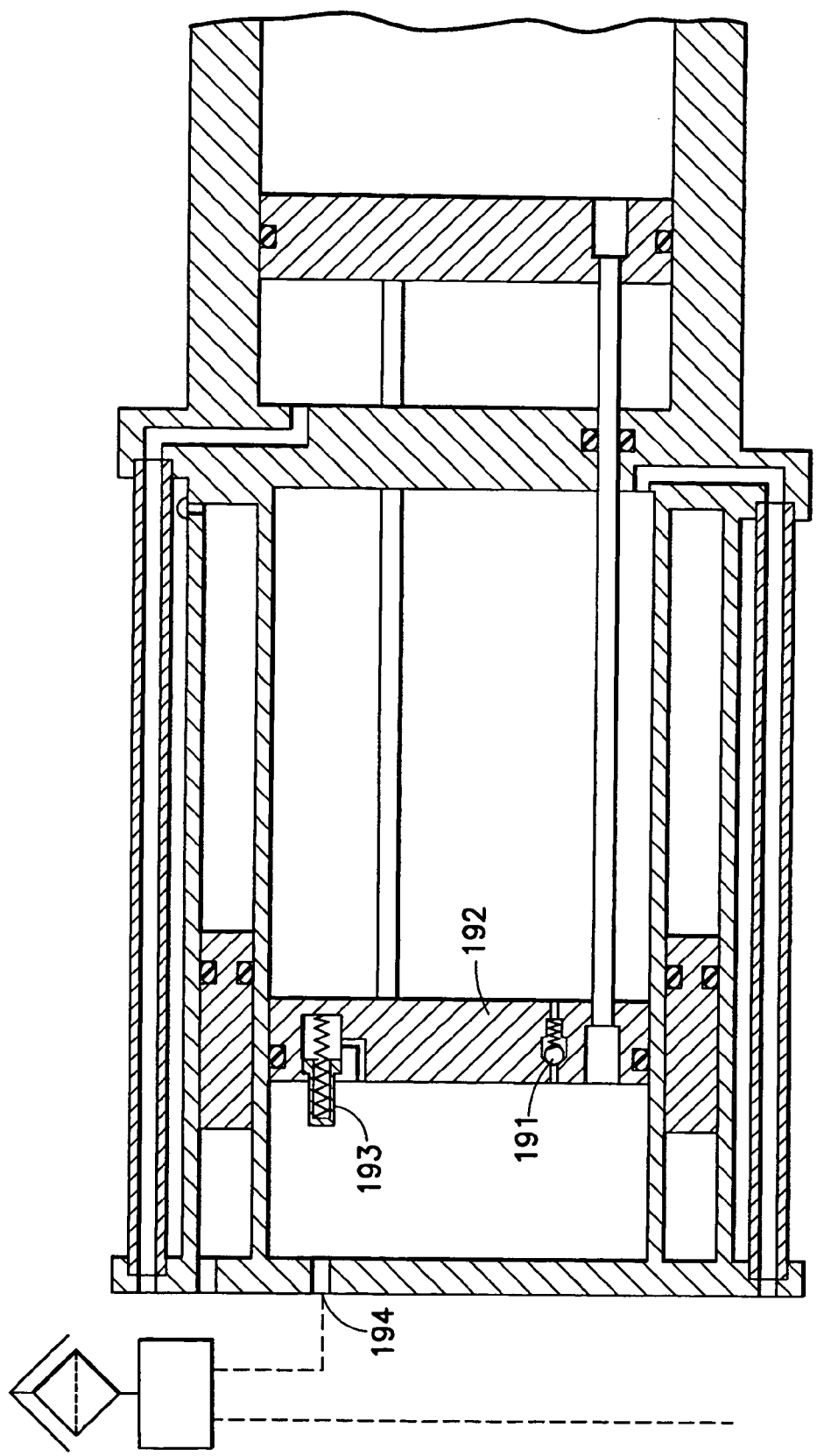
FIG. 19 is a fragmentary longitudinal sectional view of a compression pump in a LP piston.

FIG. 19 shows another embodiment of a compression pump using a compensated accumulator with multiple connecting rods such that the pistons are held at a defined verticality, which allows the recharge check valve 191 to be mounted in the LP piston 192. A spring loaded plunger 193, in place of STEM 170 (FIG. 17), closes off the entry port 194 to provide the same compression pump action as previously discussed with reference to the embodiment of FIG. 17.

One of the functions of the reservoir in a system using an atmospheric reservoir is to allow the escape of any air that might be introduced into the system during initial assembly and filling, or during subsequent servicing. It is inevitable that some pockets of air will remain in the hydraulic system after it has been filled. As these pockets come under pressure during initial running of the system, this air will becomes gradually dissolved in the fluid. Normal hydraulic oil, for example, contains about 10% by volume of dissolved air at atmospheric pressure. This amount increases proportionately with pressure, so saturation at two atmospheres would lead to 20% by volume when returned to atmospheric. As the oil entering the system is saturated at atmospheric pressure, the additional air dissolved under pressure will increase the amount of air above 10%. Then, when the oil circulates back to the reservoir, the air will be released to atmosphere. This process provides a continual purging of air from the hydraulic system, and is an important but little known factor supporting the effectiveness of hydraulic systems.

Sealed SHEP systems have no atmospheric reservoir, so the trapped air has no means of escape. Present practice is to circulate the fluid through an atmospheric reservoir during testing, by means of a separate circulation pump, for long enough to allow all the trapped air to be removed. This process is uncertain and time consuming, particularly for industrial accumulators lying on their side which trap a large amount of air. Piston type accumulators offer an advantage in that the ports can be readily positioned to minimise the amount of trapped air, as discussed with reference to FIG. 15.

Figure 20:
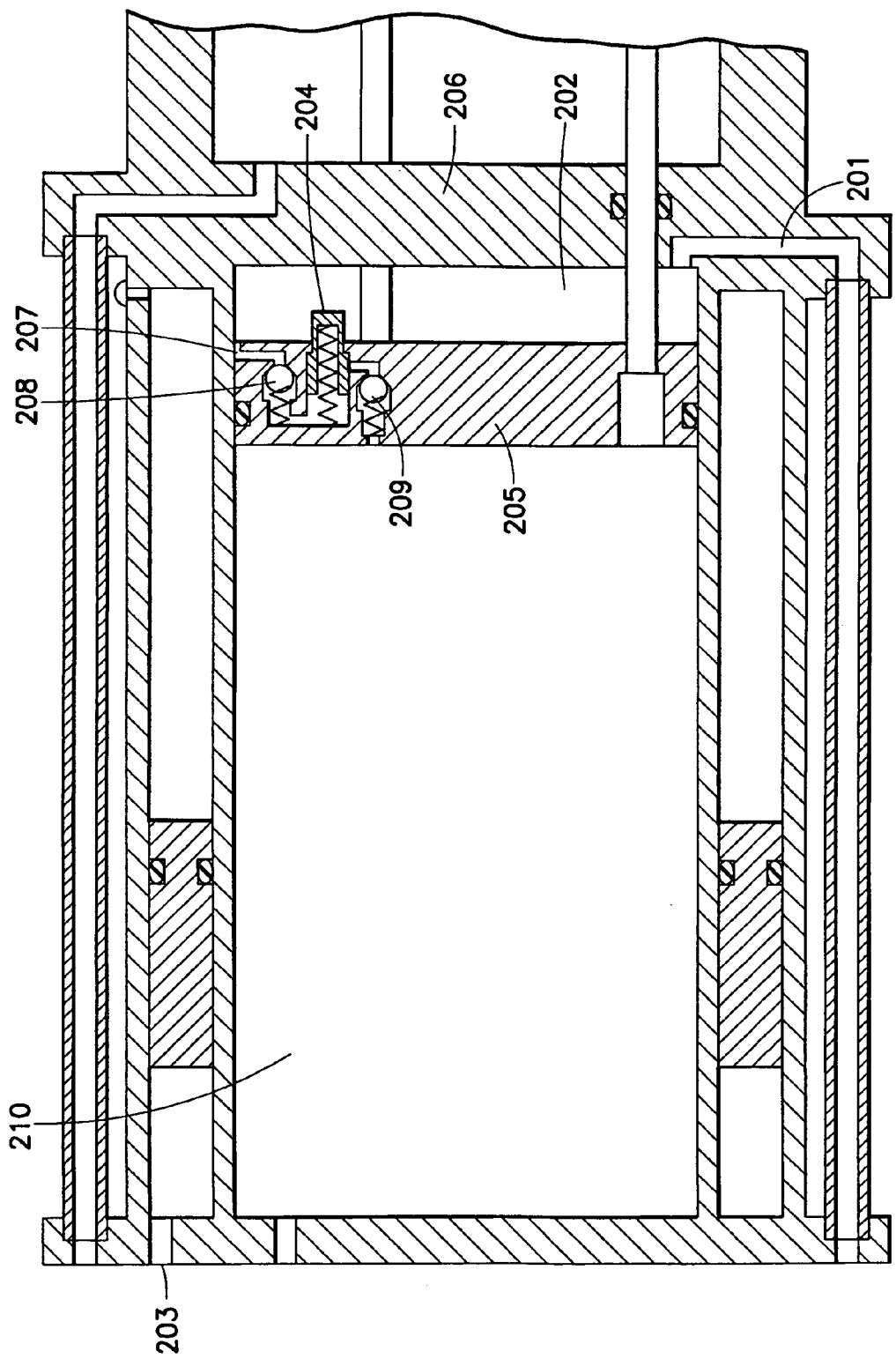
FIG. 20 is a longitudinal sectional view of an air purged system.

Given the presence of a recharge pump, such as the types previously described, automatic air purging of a SHEP system can be achieved as will now be described with reference to FIG. 20. With a compensated accumulator with multiple connecting rods, so that the verticality of the pistons is fixed, the connection 201 to the LP chamber 202 is positioned towards the bottom of the accumulator, so that any free air will tend to become trapped at the top of the LP chamber. As far as possible, the remainder of the system, including particularly the P/M case and small accumulator, will be designed and connected to minimise the trapping of air. The connection to the small accumulator 203 is shown at the top, by way of example.

A small spring return plunger pump 204 is mounted in the LP piston 205, so that it will be operated by contact with the barrier wall 206 as the system becomes fully charged, with piston movement fully to the right. The inlet to the plunger pump draws from the top of the LP chamber at passage 207 to pick up any air that may be present, and then through inlet check valve 208. The delivery of the pump passes through outlet check valve 209 to the atmospheric chamber 210. The spring strength of check valve 209 must be strong enough to hold back the LP pressure, so that there is only flow when the plunger is operated.

Alternatively, the plunger pump could be mounted in the barrier wall and operated by contact with the LP piston, then communicated to the atmospheric chamber by conduits. This would be required if the piston verticality was not ensured. Any air that is pumped will pass out through the filter breather. Under normal conditions it will only be hydraulic fluid that is pumped. If the dissolved air is greater than the 10% saturation (for oil) at atmospheric pressure, this surplus air will be released and pass out through the filter breather The recharge pump will then pump the fluid back into the system. Continued operation of the system, by cycling the fluid through the atmospheric chamber, will tend to slowly bring the dissolved air in the system towards the atmospheric saturation level.

Unless a mechanical stop is provided for the HP piston, there is a danger of over-stressing the connecting rod(s) if the accumulator continues to be charged after the LP piston has reached the end of its stroke. While the use of a position sensing system as previously described would allow for a control system to prevent this occurrence, there is advantage in having an automatic system that positively acts to prevent such an occurrence.

Figure 22:
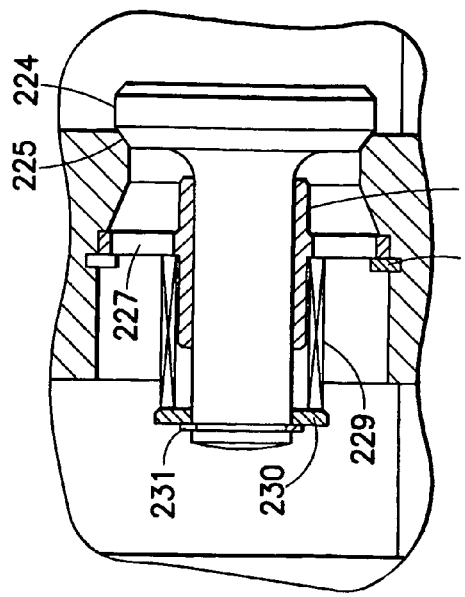
FIG. 22 is an enlarged sectional view of the spool valve in FIG. 21 in a closed position.
Figure 23:
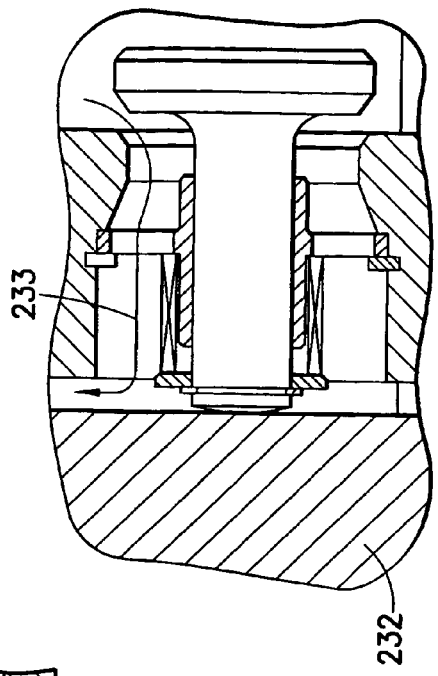
FIG. 23 is an enlarge sectional view of the spool valve shown in FIG. 21 in an open position.
Figure 21:
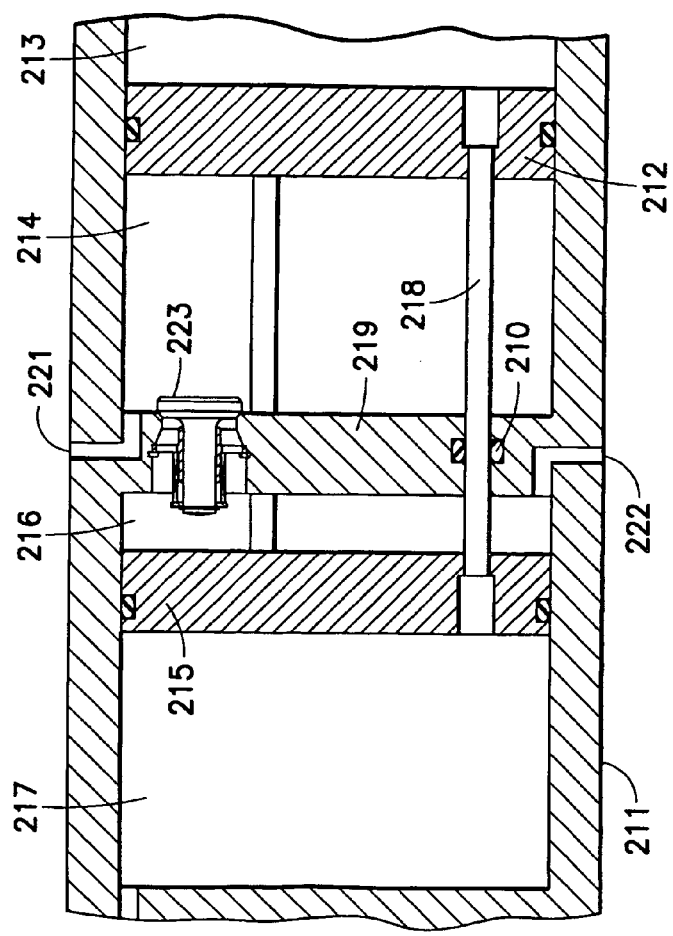
FIG. 21 is a longitudinal sectional view of an end of stroke protection apparatus.

FIGS. 21, 22 and 23 show a preferred embodiment of such an end of stroke protection system. FIG. 21 shows a compensated accumulator 211, with an HP piston 212 separating the HP gas 213 from the HP fluid 214. The LP piston 215 separates the LP fluid 216 from the atmospheric chamber 217. The two pistons are connected by a number of connecting rods 218, which pass through the centre plate 219 with seals 220. The accumulator is charged through HP port 221, with return LP flow from LP port 222. These flows are reversed during discharge of the accumulator. The centre plate incorporates an end of stroke (EOS) valve 223.

Referring to FIG. 22, the EOS valve consists of a stemmed poppet valve 224 engaging with a valve seat 225 formed in the centre plate. The poppet valve is loosely supported in valve guide 226. The valve guide has a number of holes 227 to allow fluid flow and is retained in the centre plate by retaining ring 228. The poppet valve is urged to the closed position shown by spring 229 acting between the valve guide and the poppet valve through washer 230 and retaining ring 231.

This embodiment uses a self-aligning poppet valve design with a frusto-conical seat and a mating spherical portion on the poppet valve. In addition to being closed by the spring the valve is held closed by the action of high pressure. The piston assembly moves to the right as the accumulator is charged until the LP piston contacts the end of the poppet valve stem. Further movement acts to open the valve and relieve the high pressure into the low pressure, which recirculates the fluid to the pump inlet.

FIG. 23 illustrates this action with the LP piston 232 pushing the valve open to permit flow path 233. This system simplifies the controls of the energy storage system as it is then permissible to fully charge the accumulator without concern of damage, reducing the need for accurate position sensing or accurate pressure measurement with compensation for temperature. Providing that adequate cooling is provided, a system incorporating this valve can provide continued vehicle braking with the P/M after the accumulator is fully charged, as the vehicle kinetic energy is converted to heating of the fluid by the throttling action of the EOS valve.

It is common practice to use part of the stored HP fluid as a servo supply for the control of the P/M as this removes the need to provide another source of servo energy. However this leads to difficulties when the accumulator is filly discharged, as there is then no HP servo available This can be overcome by the use of biasing of the P/M control, by a suitable spring or other means, so that the P/M inherently comes on stroke, but it is difficult to provide a fast control response.

For this reason it is normal practice to avoid fully discharging the accumulator during normal use so that servo pressure is always available, with the spring bias only used for initial start-up when the accumulator is unavoidably fully discharged. This prevents the full energy capability of the accumulator being used and leads to complexity of control requiring either accurate measurement of the position of the piston assembly or accurate measurement of pressure and temperature.

Figure 25:
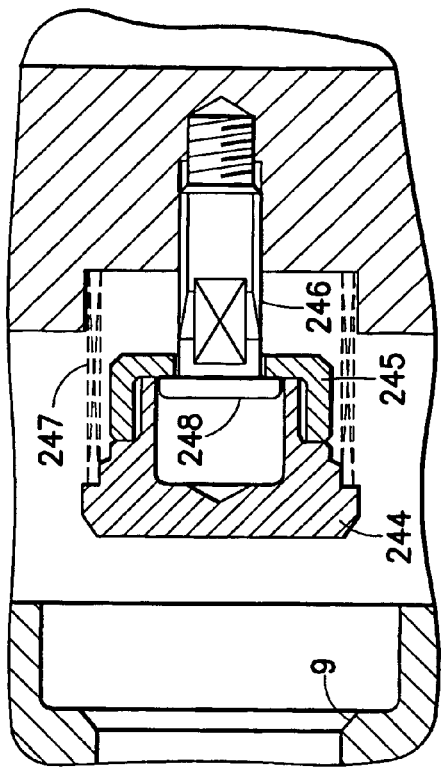
FIG. 25 is an enlarged sectional view of the servo supply shown in FIG. 24 in an open position.
Figure 26:
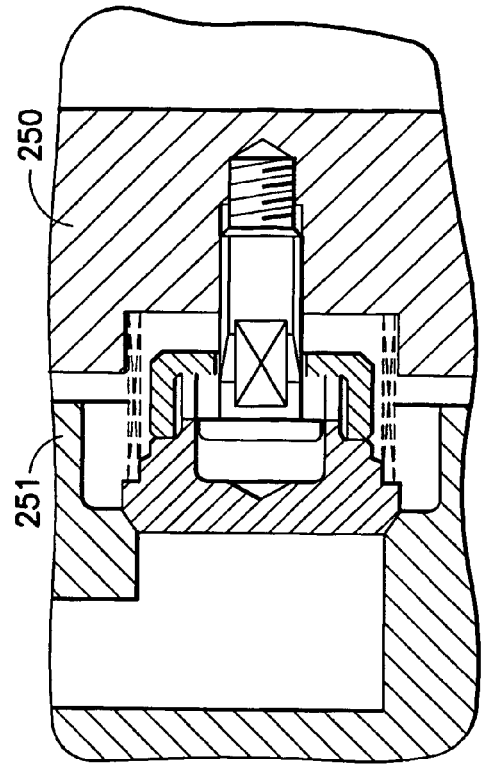
FIG. 26 is an enlarged sectional view of the servo supply shown in FIG. 24 in a closed position.
Figure 24:
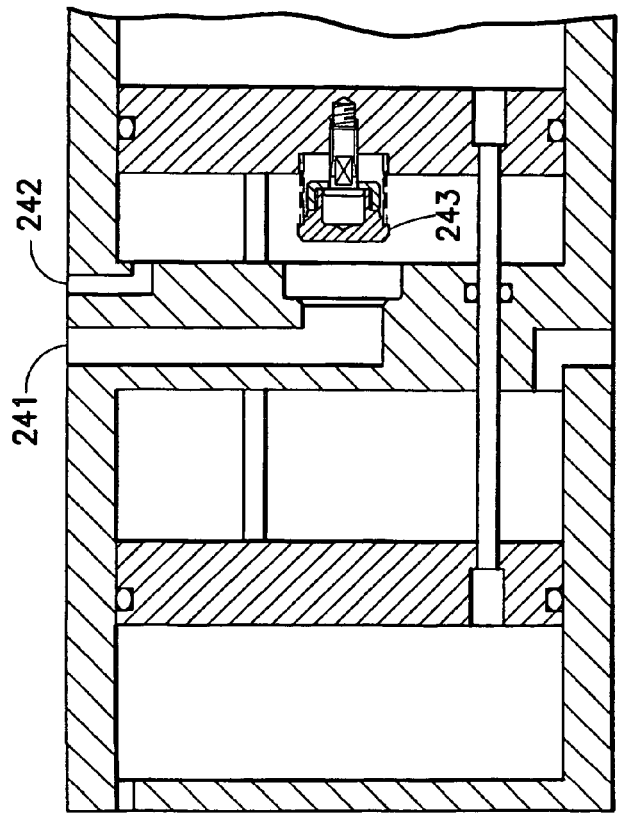
FIG. 24 is a fragmentary sectional view of an auxiliary high pressure servo supply.

FIGS. 24, 25 and 26 illustrate a preferred embodiment of a means for automatically preventing the complete discharge of the accumulator so that a residual amount of HP fluid is available for servo supply. FIG. 24 shows a compensated accumulator as previously described with HP and LP pistons joined by a plurality of connecting rods passing through the centre plate. There are two HP ports, a main port 241 and a servo supply port 242. The valve assembly 243 preferably is a thumb valve illustrated more clearly with reference to FIGS. 25 and 26 as a valve poppet 244 with a cap 245, joined together by threaded means, to be slidably mounted onto a stem 246 which is attached to the HP piston by threaded means. A spring 247 urges the poppet assembly away from the HP piston as far as the head 248 on the stem allows.

A valve seat 249 is incorporated in the centre plate. This seat engages with a corresponding mating surface on the poppet as the thumb valve closes. This embodiment uses a self-aligning poppet valve design with a frusto-conical seat and a mating spherical portion on the poppet valve. The piston assembly moves to the left as viewed in FIGS. 25 and 26 as the accumulator discharges. As the HP piston approaches the centre plate, the thumb valve closes against the seat in the centre plate, trapping an amount of HP fluid so that it can no longer discharge through the main HP port. However, the servo port is still open and HP fluid is available through this port.

FIG. 26 illustrates the configuration of the thumb valve as it closes and after some servo flow has been used The HP piston 250 has nearly contacted the centre plate 251, with the poppet sealing against the seat The poppet assembly has partially moved down the stem against the spring. The poppet assembly is also held closed by the action of high pressure because the main port is no longer at pressure.

Further use of servo fluid would cause the HP piston to move closer to the centre plate until they make contact. There is then no further servo fluid available. The travel of the poppet assembly on the stem slightly exceeds the closing travel of the HP piston so that the main contact is between the HP piston and the centre plate and not through the thumb valve assembly. The thumb valve simplifies the controls of the energy storage system as it then permissible to fully discharge the main HP port and still retain some energy for servo operation, reducing the need for accurate position sensing or accurate pressure measurement with compensation for temperature. The thumb valve provides an additional advantage in that the pressures on each side of the seal of the HP piston are maintained as approximately equal during normal operation, with the seal only requiring to hold the full gas precharge pressure when the servo allowance is fully discharged.

A SHEP energy storage system consists of a number of components connected together mechanically and by fluid conduits, which is then charged with gas under pressure and hydraulic fluid. The charging is critical to the successful operation of the system, with the correct gas pressures and correct amount of fluid being required. After initial charging, the fluid will be contaminated with air, which has to be purged from the system. It is desirable from the vehicle assembly point of view that the energy storage system be a complete unitary assembly that is fully charged, purged and tested prior to installation, in much the same way as a conventional vehicle transmission. The energy storage system then only requires connection of the external control devices, whether electrical or mechanical, to be a fully functioning unit.

Figure 27:
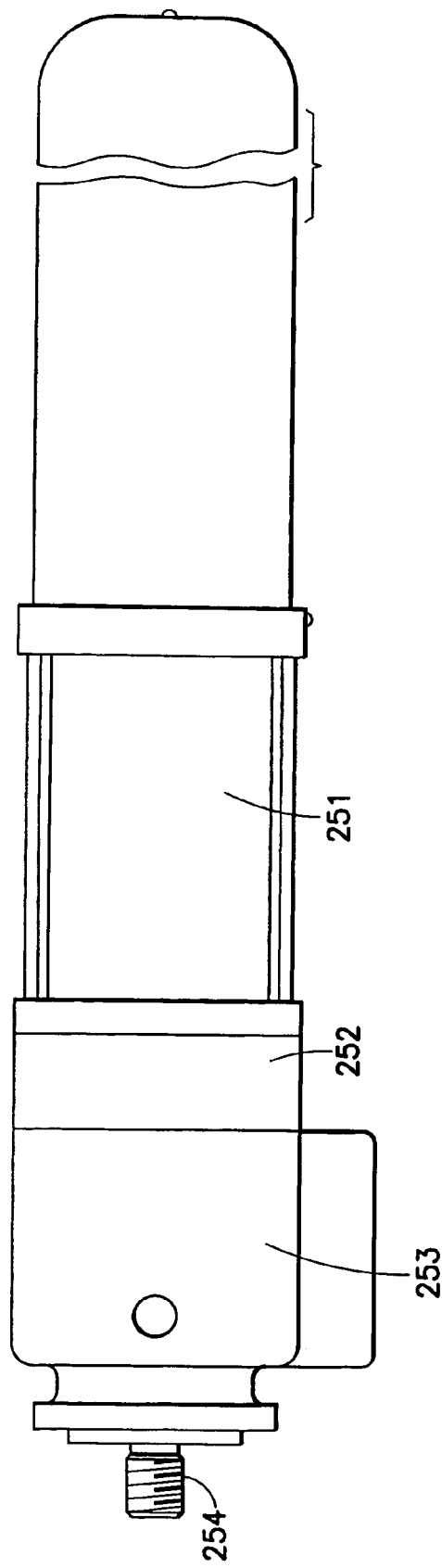
FIG. 27 is a side elevation, partly cut away, of a unitary construction with overcentre pump/motor.

FIG. 27 shows a compact accumulator assembly 251, as described with reference to FIG. 15, incorporating a valve block 252, as described with reference to FIG. 10. An overcentre type of P/M 253 is directly mounted to the assembly with all connections within the assembly itself. The assembly is mounted in the vehicle with resilient mounts to minimise the transmission of noise and vibration within the assembly. The drive shaft 254 can be connected to the drive train with a universal propeller shaft, either at the transmission or at an axle, depending on the layout of the vehicle. The unitary assembly can be directly mounted to the transmission and become part of the overall engine and transmission assembly. If the vehicle has a chassis mounted final drive, with universal shafts to the wheels, the unitary assembly can be directly mounted to the final drive.

Figure 28:
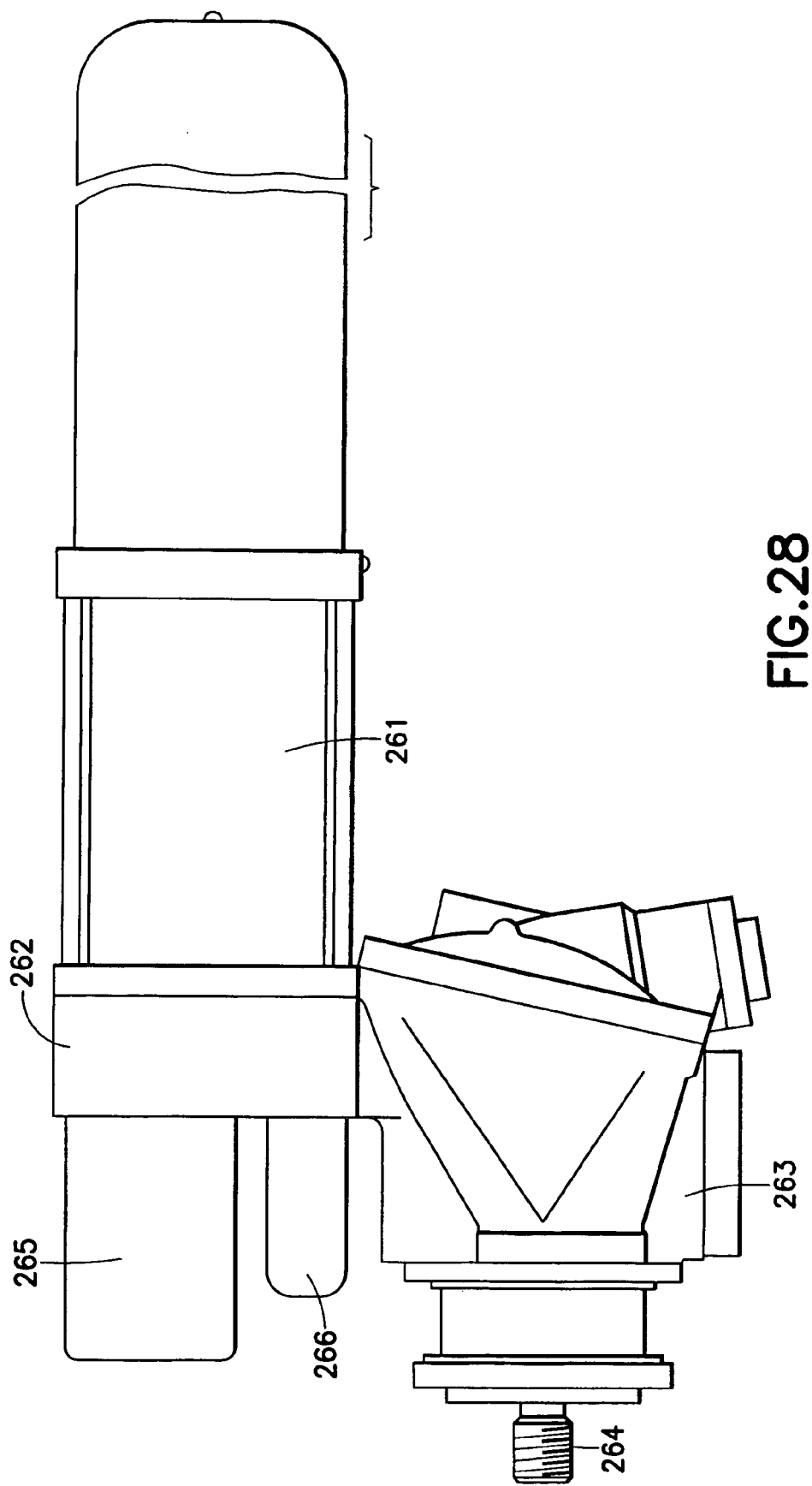
FIG. 28 is a side elevation, partly cut away, of a unitary construction with non-overcentre pump/motor.
Figure 29:
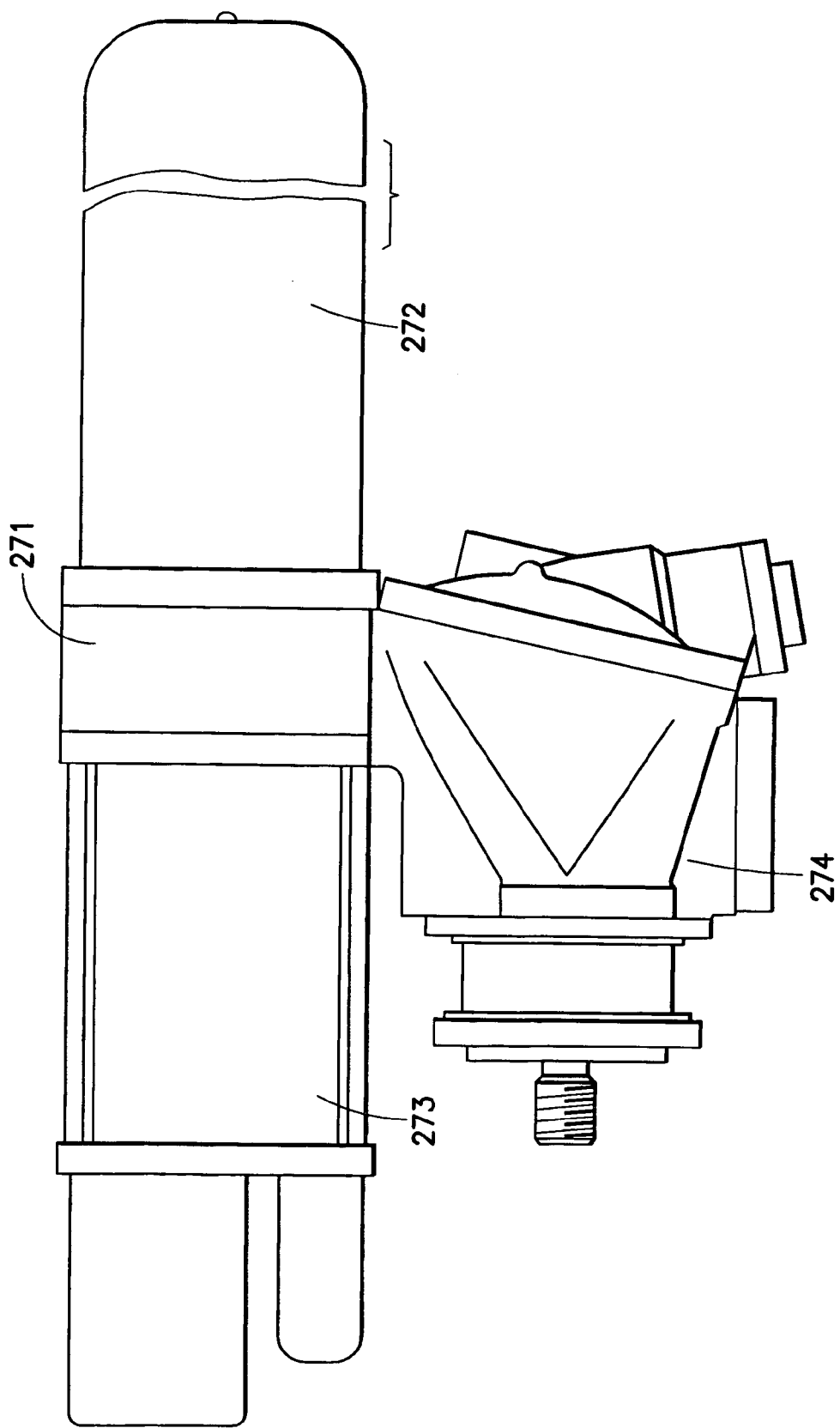
FIG. 29 is a side elevation, partly cut away, of a unitary construction with non-flexible conduits overcentre pump/motor at centre position.

FIG. 28 shows a similar arrangement with an accumulator assembly 261 and valve block 262 as described above, and with a non-overcentre P/M 263 as part of the assembly. The shaft 264 can be connected to the drive train as previously described. A cooling system 265 and filter 266 are also shown as part of the unitary assembly. FIG. 28 shows the Pressure Compensated Accumulator directly attached to the Valve Block with Filter and Cooler directly attached to the Valve Block. It also shows the Pump/Motor unit directly attached to the Valve Block. This arrangement can be reconfigured as shown in FIG. 29 with the Pump/Motor unit directly mounted to the Valve Block at the centre of the Unitised Accumulator System. This allows for the complete system to be filled with oil, bled or air and pretested before installation into the vehicle.

FIG. 29 shows such another arrangement with the valve block 271 mounted between the HP end 272 of the accumulator assembly and the LP end 273, and the P/M 274 mounted to the valve block as before.

Figure 30:
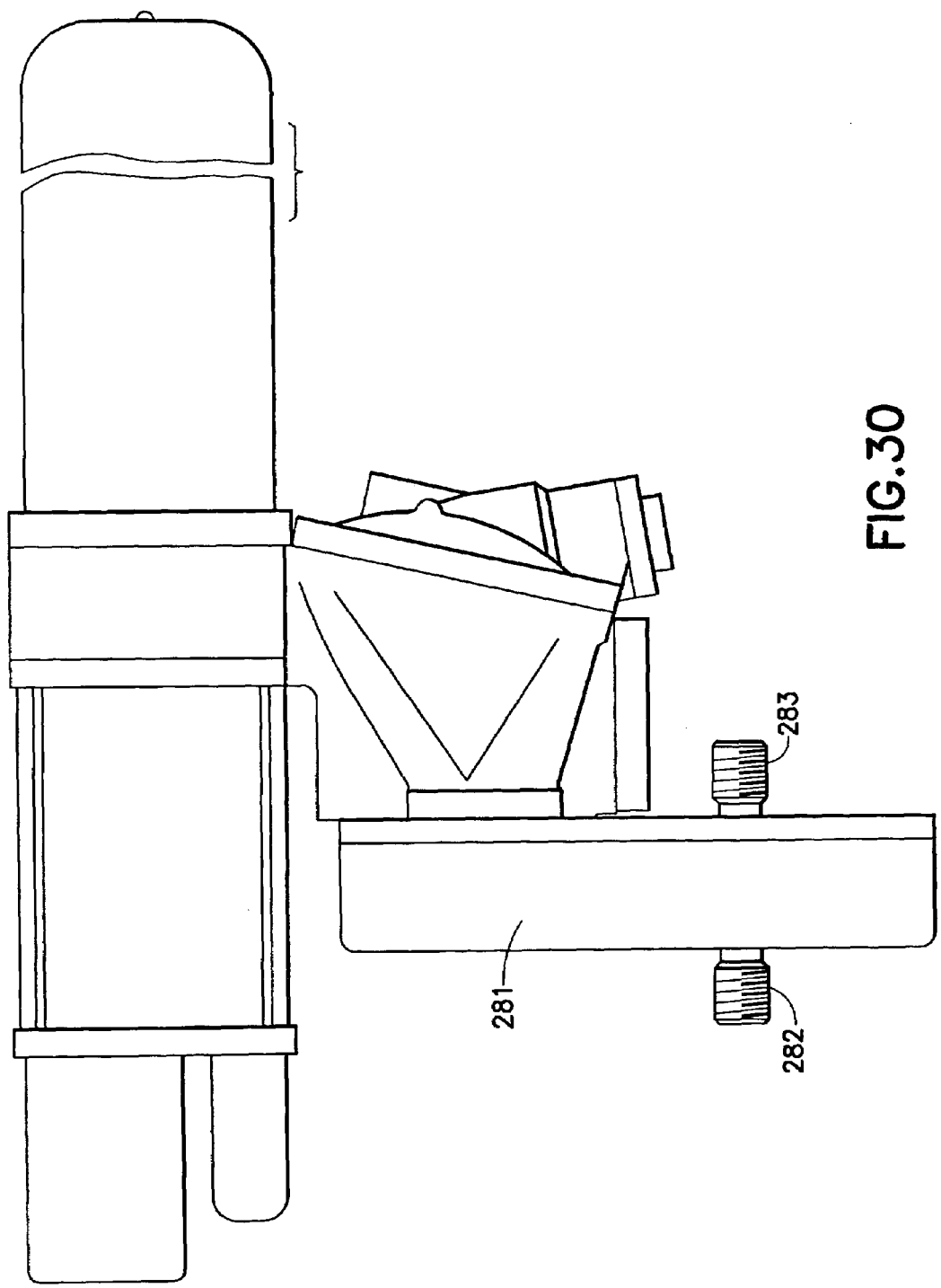
FIG. 30 is a side elevation, partly cut away, of a unitary construction with transfer gear box.

FIG. 30 shows the addition of the transfer box, which allows the system to be connected into the power train. This construction is generally suitable for commercial vehicles such as buses where the propeller shaft connecting the engine and transmission to the axle can be interrupted by a transfer case 281. In this embodiment the unitary assembly includes the transfer case. The transfer case can transfer the drive through gears, transmission chain or drive belts. Either of the shafts 282 or 283 can be connected to the transmission with the other then being connected to the axle.

Figure 31:
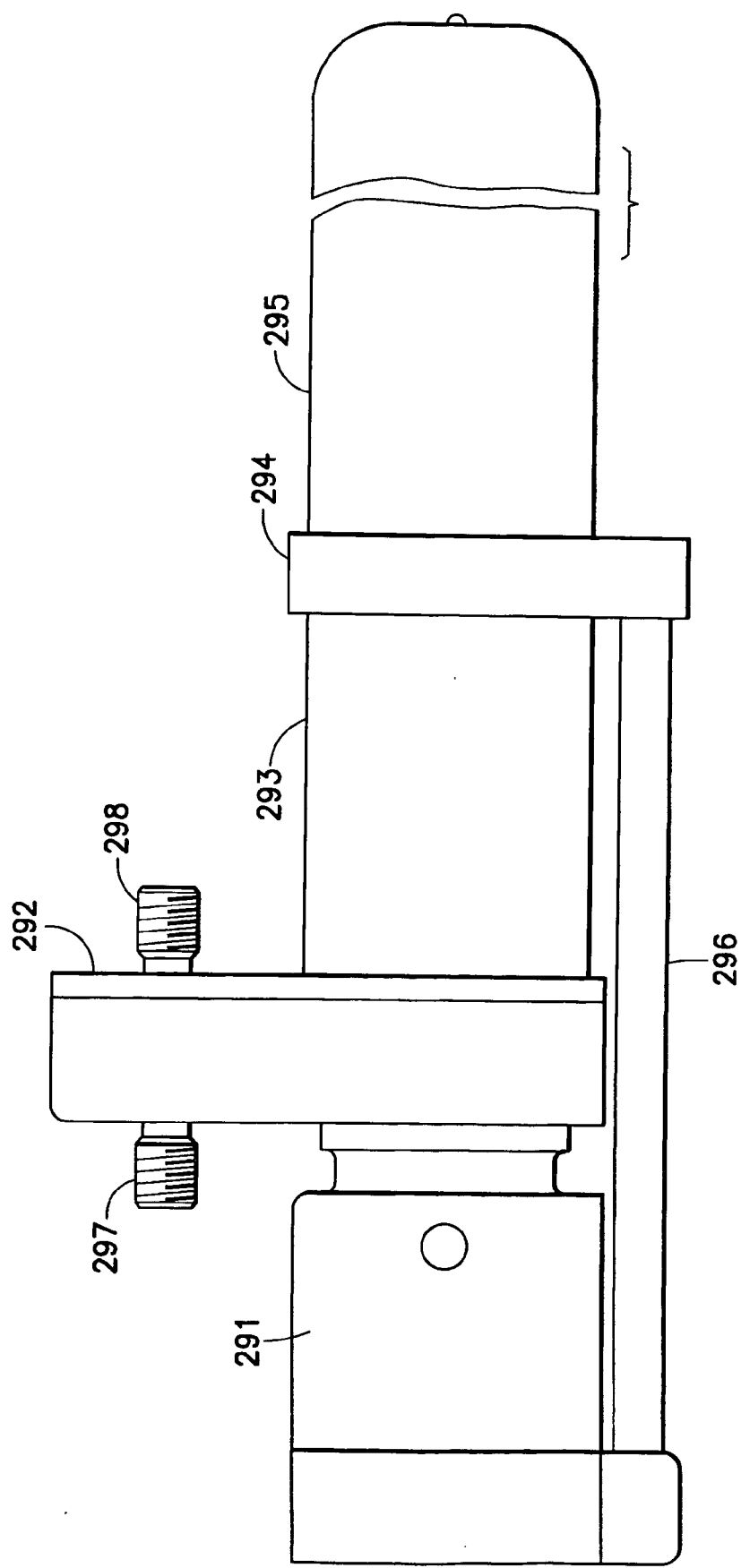
FIG. 31 is a side elevation, partly cut away, of an unitary construction with reversed pump/motor.

FIG. 31 shows a variation on the configuration of FIG. 30 that is more suitable for vehicles with limited width between the chassis rails. The P/M 291 is mounted at the front, towards the vehicle engine, and approximately in line with the accumulator assembly. The P/M 291 is mounted on a transfer case 292 with its shaft, not shown, pointing rearward The LP end 293 of the compensated accumulator is mounted on the rearward side of the transfer case, then the centre plate 294 and HP end 295. Conduits 296 connect the centre plate with the P/M. Any control valves required can be either mounted in the centre plate or in the port block of the pump, or some in each. The transfer shaft 297 is connected to the vehicle engine with a conventional drive shaft. Because the P/M is to the front, there is enough length for a shaft with universal joints. The other shaft 298 is connected to the rear drive axle of the vehicle using another conventional drive shaft. FIG. 31 illustrates the embodiment with an over-centre P/M. A non-overcentre design, as shown in FIG. 30, can also be used. Although the unitary construction is described in conjunction with a particular design of compact accumulator, the same principles can be applied to other accumulator arrangements.

The invention claimed is:

1. A hydraulic energy storage system for use in a vehicle comprising a high pressure accumulator, a first low pressure accumulator and a second low pressure accumulator connected in parallel, a pump/motor in fluid communication with the high pressure accumulator and with the first and second low pressure accumulators for pumping a fluid from the first and second low pressure accumulators to the high pressure accumulator when the pump/motor is driven in a pump mode and for returning fluid to the first and second low pressure accumulators when the pump/motor is in a motor mode, said pump/motor having a case for circulating fluid there through, a first check valve in series between the pump/motor and the second low pressure accumulator when the pump/motor is in the motor mode for unidirectional flow of a portion of fluid from the pump/motor to the second low pressure accumulator, a cooler in fluid communication in series between the case of the pump/motor, the second low pressure accumulator, and the pump/motor, and a second check valve in series between the second low pressure accumulator and the pump/motor case for unidirectional flow of fluid from the second low pressure accumulator through pump/motor case and the cooler to the pump/motor for cooling of said portion of the fluid when the pump/motor is in the pump mode.

2. A unitized accumulator system comprising the compensated accumulator as claimed in claim 1 in which the cylindrical housing is incorporated with a valve block and with an overcentre-type pump/motor or non-overcentre-type pump/motor for a unitary structure for direct mounting to a vehicle final drive.

3. A compensated accumulator for use in a hydraulic energy storage system for use in a vehicle comprising a cylindrical housing having a longitudinal axis and having a high pressure chamber and a low pressure chamber concentric with the longitudinal axis, a high pressure piston mounted transversely in the high pressure chamber for reciprocal axial travel in the high pressure chamber and a low pressure piston mounted transversely in the low pressure chamber for reciprocal axial travel in the low pressure chamber, and at least three equispaced rods connecting the high pressure piston to the low pressure piston for maintaining the pistons perpendicular to the longitudinal axis of the cylindrical housing during reciprocal travel.

4. A compensated accumulator as claimed in claim 3, having an atmospheric chamber at the distal end of the low pressure chamber in which the low pressure piston reciprocates, said low pressure piston having axial plunger extending therefrom, a surge reservoir for receiving fluid draining from a piston/motor, a cylindrical gallery formed in an end wall of the low pressure chamber for sealingly receiving the piston plunger and for receiving fluid from the surge reservoir for draining into the atmospheric chamber, and a fluid outlet in the bottom of the atmospheric chamber in communication with said low pressure accumulator or low pressure chamber through a check valve, whereby insertion of the piston plunger closes the atmospheric chamber to the atmosphere and compression of air in the atmospheric chamber opens the check valve to pump fluid in the bottom of the atmospheric chamber to the low pressure accumulator or low pressure chamber.

5. A compensated accumulator as claimed in claim 3 having an atmospheric chamber at the distal end of the low pressure chamber in which the low pressure piston reciprocates, a surge reservoir for receiving fluid draining from a piston/motor, an opening formed in an end wall of the low pressure chamber for receiving fluid from the surge reservoir for draining into the atmospheric chamber, plunger means formed in the piston for closing said end wall opening, and a fluid outlet in the bottom of the atmospheric chamber in communication with said low pressure accumulator or chamber through a check valve, whereby reciprocal movement of the piston and plunger means closes the atmospheric chamber to the atmosphere and compression of air in the atmospheric chamber opens the check valve to pump fluid in the bottom of the atmospheric chamber to the low pressure accumulator or low pressure chamber.

6. A compensated accumulator as claimed in claim 3 having an atmospheric chamber at the distal end of the low pressure chamber in which a spring return plunger pump is mounted in proximity to the top of the low pressure piston extending into the low pressure chamber for abutment with a barrier wall separating the low pressure chamber from the high pressure chamber, an inlet to the plunger pump from the low pressure chamber formed in the top of the low pressure piston, a normally-closed check valve in the inlet for undirectional flow from the low pressure chamber into the plunger pump and an outlet from the plunger pump to the atmospheric chamber, and a normally-closed check valve in the outlet for undirectional flow from the plunger pump to the atmospheric chamber, whereby abutment of the plunger pump against the barrier wall during reciprocal movement of the low pressure piston pumps any air present at the top of the low pressure chamber into the atmospheric chamber.

7. A compensated accumulator as claimed in claim 6 in which the plunger pump is mounted in the barrier wall and conduit means formed in the barrier wall direct pumped air to the atmosphere.

8. A compensated accumulator as claimed in claim 3 having an atmospheric chamber at the distal end of the low pressure chamber, in which the cylindrical housing has a barrier wall separating the high pressure chamber from the low pressure chamber, a poppet valve seated in a valve seat formed in the barrier wall and biased for normally-closed flow from the high pressure chamber to the low pressure chamber, said poppet valve having a stem projecting into the low pressure chamber, whereby abutment of the low pressure piston against the poppet stem opens the poppet valve to permit flow of high pressure fluid from the high pressure chamber into the low pressure chamber.

9. A compensated accumulator as claimed in claim 3 having an atmospheric chamber at the distal end of the low pressure chamber, in which the cylindrical housing has a barrier wall separating the high pressure compensated chamber from the low pressure chamber, a poppet thumb valve mounted on the high pressure piston projecting towards the barrier wall, a valve seat for the poppet thumb valve formed on the barrier wall in fluid communication with the low pressure chamber for receiving the poppet thumb valve for closure before complete discharge of high pressure fluid from the high pressure chamber, and a servo supply port formed in the barrier wall in fluid communication with the pump/motor, whereby residual high pressure fluid in the high pressure chamber after closure of the poppet thumb valve is directed to the motor pump.

10. A hydraulic energy storage system for use in a vehicle comprising a high pressure accumulator, a first low pressure accumulator and a second low pressure accumulator connected in parallel, a pump/motor in fluid communication with the high pressure accumulator and with the first and second low pressure accumulators for pumping a fluid from the first and second low pressure accumulators to the high pressure accumulator when the pump/motor is driven in a pump mode and for returning fluid to the first and second low pressure accumulators when the pump/motor is in a motor mode, said pump/motor having a case for circulating fluid therethrough, a first check valve in series between the pump/motor, the pump case and a cooler for unidirectional flow of a portion of fluid from the pump/motor through the pump case and the cooler and a second check valve in series with the cooler and the second low pressure accumulator for unidirectional flow of said portion of fluid from the cooler to the second low pressure accumulator for cooling said portion of fluid when the pump/motor is in the motor mode, a third check valve in series with the second low pressure accumulator and the pump/motor and a fourth check valve in series with the cooler and the first check valve for unidirectional flow of a portion of fluid from the second low pressure accumulator to the pump/motor case and through the cooler to the pump/motor for cooling said portion of the fluid when the pump/motor is in the pump mode.

11. A compensated accumulator for use in hydraulic energy storage system for use in a vehicle comprising a cylindrical housing having a longitudinal axis and having a high pressure chamber and a low pressure chamber concentric with the longitudinal axis, one of said high pressure chamber and said low pressure chamber having a larger diameter than the other, a high pressure piston slidably mounted for reciprocal travel in the high pressure chamber and a low pressure piston slidably mounted for reciprocal travel in the low pressure cylinder, one of said high pressure piston and low pressure piston having a larger diameter than the other for creating a flow imbalance between the high pressure cylinder and the low pressure cylinder, a pump/motor in fluid communication with the high pressure chamber and with the low pressure chamber for pumping a fluid from the low pressure chamber to the high pressure chamber when the pump/motor is driven in a pump mode and for returning fluid to the low pressure chamber when the pump/motor is in a motor mode, said pump/motor having a case for circulating fluid therethrough, a low pressure accumulator connected in parallel with the low pressure chamber for receiving and discharging a portion of fluid from the high pressure or low pressure chambers due to the flow imbalance between the high pressure cylinder and the low pressure cylinder, during the pump mode or the motor mode, a cooler in fluid communication with the pump/motor casing, a first check valve in series between the pump/motor, the pump case and the cooler for unidirectional flow of a portion of fluid from the pump/motor through the pump case and the cooler and a second check valve in series with the cooler and the low pressure accumulator for unidirectional flow of said portion of fluid from the cooler to the low pressure accumulator for cooling said portion of fluid when the pump/motor is in the motor mode, a third check valve in series with the low pressure accumulator and the pump/motor and a fourth check valve in series with the cooler and the first check valve for unidirectional flow of a portion of fluid from the low pressure accumulator to the pump/motor case and through the cooler to the pump/motor for cooling a portion of the fluid when the pump/motor is in the pump mode.

12. A compensated accumulator as claimed in claim 11 in which the high pressure piston is larger than the low pressure piston whereby outflow from the high pressure chamber is greater than the inflow to the low pressure chamber for maintaining a high fluid pressure and for creating positive flow imbalance from the high pressure cylinder to the low pressure cylinder.

13. A compensated accumulator as claimed in claim 12 in which the low pressure accumulator is an annular chamber formed concentric within the low pressure chamber, and comprising an annular accumulator piston slidably mounted for reciprocal travel in the annular accumulator chamber.

14. A compensated accumulator as claimed in claim 13 in which the annular accumulator piston is an elongated annular ring.

15. A compensated accumulator as claimed in claim 14 having an atmospheric chamber at the distal end of the low pressure chamber in which the low pressure piston reciprocates, said low pressure piston having axial plunger extending therefrom, a surge reservoir for receiving fluid draining from a piston/motor, a cylindrical gallery formed in an end wall of the low pressure chamber for sealingly receiving the piston plunger and for receiving fluid from the surge reservoir for draining into the atmospheric chamber, and a fluid outlet in the bottom of the atmospheric chamber in communication with a low pressure accumulator or low pressure chamber through a check valve, whereby insertion of the piston plunger closes the atmospheric chamber to the atmosphere and compression of air in the atmospheric chamber opens the check valve to pump fluid in the bottom of the atmospheric chamber to the low pressure accumulator or low pressure chamber.

16. A compensated accumulator as claimed in claim 14 having an atmospheric chamber at the distal end of the low pressure chamber in which the low pressure piston reciprocates, a surge reservoir for receiving fluid draining from a piston/motor, an opening formed in an end wall of the low pressure chamber for receiving fluid from the surge reservoir for draining into the atmospheric chamber, plunger means formed in the piston for closing said end wall opening, and a fluid outlet in the bottom of the atmospheric chamber in communication with a low pressure accumulator or chamber through a check valve, whereby reciprocal movement of the piston and plunger means closes the atmospheric chamber to the atmosphere and compression of air in the atmospheric chamber opens the check valve to pump fluid in the bottom of the atmospheric chamber to the low pressure accumulator or low pressure chamber.

17. A compensated accumulator as claimed in claim 14 having an atmospheric chamber at the distal end of the low pressure chamber in which a spring return plunger pump is mounted in proximity to the top of the low pressure piston extending into the low pressure chamber for abutment with a barrier wall separating the low pressure chamber from the high pressure chamber, an inlet to the plunger pump from the low pressure chamber formed in the top of the low pressure piston, a normally-closed check valve in the inlet for undirectional flow from the low pressure chamber into the plunger pump and an outlet from the plunger pump to the atmospheric chamber, and a normally-closed check valve in the outlet for undirectional flow from the plunger pump to the atmospheric chamber, whereby abutment of the plunger pump against the barrier wall during reciprocal movement of the low pressure piston pumps any air present at the top of the low pressure chamber into the atmospheric chamber.

18. A compensated accumulator as claimed in claim 14 having an atmospheric chamber at the distal end of the low pressure chamber, in which the cylindrical housing has a barrier wall separating the high pressure chamber from the low pressure chamber, a poppet valve seated in a valve seat formed in the barrier wall and biased for normally-closed flow from the high pressure chamber to the low pressure chamber, said poppet valve having a stem projecting into the low pressure chamber, whereby abutment of the low pressure piston against the poppet stem opens the poppet valve to permit flow of high pressure fluid from the high pressure chamber into the low pressure chamber.

19. A compensated accumulator as claimed in claim 14 having an atmospheric chamber at the distal end of the low pressure chamber, in which the cylindrical housing has barrier wall separating the high pressure compensated chamber from the low pressure chamber, a poppet thumb valve mounted on the high pressure piston projecting towards the barrier wall, a valve seat for the poppet thumb valve formed on the barrier wall in fluid communication with the low pressure chamber for receiving the poppet thumb valve for closure before complete discharge of high pressure fluid from the high pressure chamber, and a servo supply port formed in the barrier wall in fluid communication with the pump/motor, whereby residual high pressure fluid in the high pressure chamber after closure of the poppet thumb valve is directed to the motor pump.

20. A compensated accumulator for use in a hydraulic energy storage system for use in a vehicle comprising a cylindrical housing having a longitudinal axis with a high pressure chamber and a low pressure chamber concentric with the longitudinal axis, said low pressure chamber having a gas end remote from the high pressure chamber and a fluid end adjacent the high pressure chamber, a high pressure piston slidably mounted for reciprocal axial travel in the high pressure chamber and a low pressure piston mounted for reciprocal axial travel in the low pressure chamber, at least one connecting rod for connecting the high pressure piston and the low pressure piston together, a first position sensor mounted in the low pressure chamber adjacent the low pressure end and a second position sensor mounted in the low pressure chamber adjacent the high pressure end, whereby the first and second position sensors control reciprocal travel of the low pressure piston in the low pressure chamber, and a pressure sensor in fluid communication with the high pressure fluid chamber whereby the second position sensor or the pressure sensor controls reciprocal travel of the high pressure and low pressure pistons and actuates a heating system.

21. A compensated accumulator as claimed in claim 20 in which gas end has an end wall and in which the first position sensor is mounted in said end wall.

22. A compensated accumulator as claimed in claim 21 in which the first position sensor is mounted in the end wall on the longitudinal axis and comprises an ultrasonic transducer.

23. A compensated accumulator as claimed in claim 20 having an atmospheric chamber at the distal end of the low pressure chamber in which the low pressure piston reciprocates, said low pressure piston having axial plunger extending therefrom, a surge reservoir for receiving fluid draining from a piston/motor, a cylindrical gallery formed in an end wall of the low pressure chamber for sealingly receiving the piston plunger and for receiving fluid from the surge reservoir for draining into the atmospheric chamber, and a fluid outlet in the bottom of the atmospheric chamber in communication with said low pressure accumulator or low pressure chamber through a check valve, whereby insertion of the piston plunger closes the atmospheric chamber to the atmosphere and compression of air in the atmospheric chamber opens the check valve to pump fluid in the bottom of the atmospheric chamber to the low pressure accumulator or low pressure chamber.

24. A compensated accumulator as claimed in claim 20 having an atmospheric chamber at the distal end of the low pressure chamber in which the low pressure piston reciprocates, a surge reservoir for receiving fluid draining from a piston/motor, an opening formed in an end wall of the low pressure chamber for receiving fluid from the surge reservoir for draining into the atmospheric chamber, plunger means formed in the piston for closing said end wall opening, and a fluid outlet in the bottom of the atmospheric chamber in communication with a low pressure accumulator or chamber through a check valve, whereby reciprocal movement of the piston and plunger means closes the atmospheric chamber to the atmosphere and compression of air in the atmospheric chamber opens the check valve to pump fluid in the bottom of the atmospheric chamber to the low pressure accumulator or low pressure chamber.

25. A compensated accumulator as claimed in claim 20 having an atmospheric chamber at the distal end of the low pressure chamber in which a spring return plunger pump is mounted in proximity to the top of the low pressure piston extending into the low pressure chamber for abutment with a barrier wall separating the low pressure chamber from the high pressure chamber, an inlet to the plunger pump from the low pressure chamber formed in the top of the low pressure piston, a normally-closed check valve in the inlet for undirectional flow from the low pressure chamber into the plunger pump and an outlet from the plunger pump to the atmospheric chamber, and a normally-closed check valve in the outlet for undirectional flow from the plunger pump to the atmospheric chamber, whereby abutment of the plunger pump against the barrier wall during reciprocal movement of the low pressure piston pumps any air present at the top of the low pressure chamber into the atmospheric chamber.

26. A compensated accumulator as claimed in claim 20 having an atmospheric chamber at the distal end of the low pressure chamber, in which the cylindrical housing has a barrier wall separating the high pressure chamber from the low pressure chamber, a poppet valve seated in a valve seat formed in the barrier wall and biased for normally-closed flow from the high pressure chamber to the low pressure chamber, said poppet valve having a stem projecting into the low pressure chamber, whereby abutment of the low pressure piston against the poppet stem opens the poppet valve to permit flow of high pressure fluid from the high pressure chamber into the low pressure chamber.

27. A compensated accumulator as claimed in claim 20 having an atmospheric chamber at the distal end of the low pressure chamber, in which the cylindrical housing has a barrier wall separating the high pressure compensated chamber from the low pressure chamber, a poppet thumb valve mounted on the high pressure piston projecting towards the barrier wall, a valve seat for the poppet thumb valve formed on the barrier wall in fluid communication with the low pressure chamber for receiving the poppet thumb valve for closure before complete discharge of high pressure fluid from the high pressure chamber, and a servo supply port formed in the barrier wall in fluid communication with a pump/motor, whereby residual high pressure fluid in the high pressure chamber after closure of the poppet thumb valve is directed to the motor pump.

28. A compensated accumulator for use in a hydraulic energy storage system for use in a vehicle comprising a cylindrical housing having a longitudinal axis and having a high pressure chamber and low pressure chamber concentric with said longitudinal axis, each said high pressure chamber and said low pressure chamber having a gas end remote from each other and a fluid end adjacent each other, a high pressure piston slidably mounted for reciprocal axial travel in the high pressure chamber and a low pressure piston slidably mounted for reciprocal axial travel in the low pressure chamber, at least one connecting rod for connecting the high pressure and low pressure pistons together in axial alignment, a valve block at one end of the cylindrical housing, and a high pressure conduit communicating the high pressure fluid end to the valve block and a low pressure conduit communicating the low pressure fluid end to the valve block, and in which the high pressure and low pressure conduits are internal of the cylindrical housing disposed parallel to the longitudinal axis and pass through the low pressure piston, additionally comprising sealing means formed in the low pressure piston for slidably engaging and sealing the high pressure and low pressure conduits.

29. A compensated accumulator as claimed in claim 28 having an atmospheric chamber at the distal end of the low pressure chamber in which the low pressure piston reciprocates, said low pressure piston having axial plunger extending therefrom, a surge reservoir for receiving fluid draining from a piston/motor, a cylindrical gallery formed in an end wall of the low pressure chamber for sealingly receiving the piston plunger and for receiving fluid from the surge reservoir for draining into the atmospheric chamber, and a fluid outlet in the bottom of the atmospheric chamber in communication with a low pressure accumulator or low pressure chamber through a check valve, whereby insertion of the piston plunger closes the atmospheric chamber to the atmosphere and compression of air in the atmospheric chamber opens the check valve to pump fluid in the bottom of the atmospheric chamber to the low pressure accumulator or low pressure chamber.

30. A compensated accumulator as claimed in claim 28 having an atmospheric chamber at the distal end of the low pressure chamber in which the low pressure piston reciprocates, a surge reservoir for receiving fluid draining from a piston/motor, an opening formed in an end wall of the low pressure chamber for receiving fluid from the surge reservoir for draining into the atmospheric chamber, plunger means formed in the piston for closing said end wall opening, and a fluid outlet in the bottom of the atmospheric chamber in communication with a low pressure accumulator or chamber through a check valve, whereby reciprocal movement of the piston and plunger means closes the atmospheric chamber to the atmosphere and compression of air in the atmospheric chamber opens the check valve to pump fluid in the bottom of the atmospheric chamber to the low pressure accumulator or low pressure chamber.

31. A compensated accumulator as claimed in claim 28 having an atmospheric chamber at the distal end of the low pressure chamber in which a spring return plunger pump is mounted in proximity to the top of the low pressure piston extending into the low pressure chamber for abutment with a barrier wall separating the low pressure chamber from the high pressure chamber, an inlet to the plunger pump from the low pressure chamber formed in the top of the low pressure piston, a normally-closed check valve in the inlet for undirectional flow from the low pressure chamber into the plunger pump and an outlet from the plunger pump to the atmospheric chamber, and a normally-closed check valve in the outlet for undirectional flow from the plunger pump to the atmospheric chamber, whereby abutment of the plunger pump against the barrier wall during reciprocal movement of the low pressure piston pumps any air present at the top of the low pressure chamber into the atmospheric chamber.

32. A compensated accumulator as claimed in claim 28 a having an atmospheric chamber at the distal end of the low pressure chamber, in which the cylindrical housing has a barrier wall separating the high pressure compensated chamber from the low pressure chamber, a poppet thumb valve mounted on the high pressure piston projecting towards the barrier wall, a valve seat for the poppet thumb valve formed on the barrier wall in fluid communication with the low pressure chamber for receiving the poppet thumb valve for closure before complete discharge of high pressure fluid from the high pressure chamber, and a servo supply port formed in the barrier wall in fluid communication with a pump/motor, whereby residual high pressure fluid in the high pressure chamber after closure of the poppet thumb valve is directed to the motor pump.

33. A compensated accumulator for use in a hydraulic energy storage system for use in a vehicle comprising a cylindrical housing having a longitudinal axis and having a high pressure chamber and a low pressure chamber concentric with the longitudinal axis, a high pressure piston mounted transversely in the high pressure chamber for reciprocal axial travel in the high pressure chamber and a low pressure annular piston mounted transversely in the low pressure chamber for reciprocal travel in the low pressure chamber, at least three equispaced rods connecting the high pressure piston to the low pressure piston for maintaining the pistons perpendicular to the longitudinal axis of the cylindrical housing during reciprocal travel, a low pressure accumulator cylinder formed centrally in the low pressure chamber concentric with and within the low pressure annular piston, sealing means formed between the low pressure accumulator cylinder and the annular piston whereby the annular piston is in sliding engagement with the low pressure accumulator piston, a pump/motor in fluid communication with the high pressure chamber and with the low pressure chamber and the low pressure accumulator for pumping a fluid from the low pressure chamber and from the low pressure accumulator to the high pressure chamber when the pump/motor is in a pump mode and for returning fluid to the low pressure chamber and to the low pressure accumulator from the high pressure chamber when the pump/motor is in a motor mode, said pump/motor having a case for circulating fluid therethrough, a cooler in fluid communication with the pump/motor casing and the low pressure accumulator whereby the fluid flowing to and from the low pressure accumulator flows through the cooler when the pump/motor is in the pump and motor modes.

34. A compensated accumulator as claimed in claim 33 in which the low pressure accumulator cylinder has an access port formed in an upper portion thereof for venting air to the atmosphere.

35. A compensated accumulator as claimed in claim 34 in which the high pressure chamber has a steel liner for reciprocal axial travel of the high pressure piston therein, said steel liner defining an annulus between the steel liner and the cylinder substantially the length of the piston stroke, and fluid conduit means interconnecting said annulus with fluid in the high pressure chamber for equalizing hydraulic pressure between the liner and the chamber.

36. A compensated accumulator as claimed in claim 35 in which the liner extends substantially the length of the high pressure chamber.

* * * * *